(12) United States Patent
Na et al.

(10) Patent No.: US 10,154,263 B2
(45) Date of Patent: Dec. 11, 2018

(54) RATE-DISTORTION OPTIMIZATION-BASED QUANTIZATION METHOD AND APPARATUS

(71) Applicants: SAMSUNG ELECTRONICS CO., LTD., Suwon-si (KR); Seoul National University R&DB Foundation, Seoul (KR)

(72) Inventors: Sang-kwon Na, Seoul (KR); Soo-ik Chae, Seoul (KR); Ki-won Yoo, Seoul (KR); Soon-woo Choi, Seoul (KR); Wook-seok Jeong, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 247 days.

(21) Appl. No.: 15/184,272

(22) Filed: Jun. 16, 2016

(65) Prior Publication Data
US 2017/0064302 A1 Mar. 2, 2017

(30) Foreign Application Priority Data
Sep. 2, 2015 (KR) .................. 10-2015-0124232

(51) Int. Cl.
*H04N 19/124* (2014.01)
*H04N 19/567* (2014.01)
*H04N 19/147* (2014.01)
*H04N 19/176* (2014.01)
*H04N 19/44* (2014.01)

(52) U.S. Cl.
CPC ......... *H04N 19/124* (2014.11); *H04N 19/147* (2014.11); *H04N 19/176* (2014.11); *H04N 19/44* (2014.11); *H04N 19/567* (2014.11)

(58) Field of Classification Search
None
See application file for complete search history.

(56) References Cited

U.S. PATENT DOCUMENTS

| | | | |
|---|---|---|---|
| 6,571,016 B1 * | 5/2003 | Mehrotra | H04N 19/119 375/240.13 |
| 2013/0107969 A1 * | 5/2013 | Nguyen | H04N 19/70 375/240.18 |
| 2013/0235938 A1 | 9/2013 | Huang et al. | |
| 2013/0272385 A1 * | 10/2013 | Yu | H04N 19/147 375/240.03 |
| 2014/0140396 A1 * | 5/2014 | Wang | H04N 19/61 375/240.03 |

\* cited by examiner

*Primary Examiner* — Kaitlin A Retallick
(74) *Attorney, Agent, or Firm* — Staas & Halsely LLP

(57) ABSTRACT

Provided is a video encoding method including: calculating a difference value between a rate-distortion (R-D) cost of a first coefficient level from among coefficient levels of a sub-block and an R-D cost of a second coefficient level adjacent to the first coefficient level by using a distortion difference calculated by using an integer of the first coefficient level and an integer of the second coefficient level and a rate variation between the first coefficient level and the second coefficient level; selecting one of the integer values of the first and second coefficient levels as a modified value of the first coefficient level based on the difference value; and outputting the modified value of the first coefficient level.

13 Claims, 27 Drawing Sheets

CODING UNIT (1010)

RATE-DISTORTION OPTIMIZATION-BASED QUANTIZATION METHOD AND APPARATUS

CROSS-REFERENCE TO RELATED APPLICATION

This application claims the benefit of Korean Patent Application No. 10-2015-0124232, filed on Sep. 2, 2015, in the Korean Intellectual Property Office, the disclosure of which is incorporated herein in its entirety by reference.

BACKGROUND

1. Field

The present disclosure relates to rate-distortion optimization-based quantization methods and apparatuses, and more particularly, to a technique of calculating a value of a coefficient level considering rate-distortion optimization and searching for a last significant coefficient.

2. Description of the Related Art

As hardware for reproducing and storing high resolution or high quality video content is being developed and supplied, a need for a video codec for effectively encoding or decoding the high resolution or high quality video content is increasing. According to a general video codec, a video is encoded according to a limited encoding method based on a coding unit having a predetermined size.

Image data of the space domain is transformed into coefficients of the frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of the space domain, coefficients of the frequency domain are easily compressed. In particular, since an image pixel value of the space domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

SUMMARY

According to an aspect of an embodiment, a video encoding method includes: calculating a difference value between a rate-distortion (R-D) cost of a first coefficient level from among coefficient levels of a sub-block and an R-D cost of a second coefficient level adjacent to the first coefficient level by using a distortion difference calculated by using an integer of the first coefficient level and an integer of the second coefficient level and a rate variation between the first coefficient level and the second coefficient level; selecting one of the integer values of the first and second coefficient levels as a modified value of the first coefficient level based on the difference value; and outputting the modified value of the first coefficient level.

The video encoding method may further include: calculating a difference value of an R-D cost when a value of a coefficient level corresponding to a first sample position that is a position of a nonzero coefficient level generated last according to a forward scan order from among sample positions of the sub-block is modified to 0; sequentially calculating difference values of R-D costs in a reverse scan order when values of coefficient levels corresponding to positions of nonzero coefficient levels existing after the first sample position are modified to 0 in the reverse scan order; searching for a second sample position in which a value obtained by sequentially adding difference values of R-D costs of the sample positions according to the reverse scan order is lowest; and modifying values of coefficient levels corresponding to sample positions before the second sample position to 0 according to the reverse scan order.

The video encoding method may further include: determining a coefficient level corresponding to the second sample position from among the coefficient levels as a last significant coefficient (LSC); and encoding information indicating a position of the LSC.

The searching for the second sample position may include stopping searching for the second sample position when a sample position in which a value of a coefficient level is equal to or higher than 2 is found.

The searching for the second sample position may include calculating a lowest value of a prefix sum in a structure of a prefix tree, wherein the structure of the prefix tree may be a structure in which two sample positions adjacent in the reverse scan order are assigned as a pair and difference values of R-D costs corresponding to the two sample positions in the pair are sequentially added.

When a value of the first coefficient level is 0, the modified value of the first coefficient level is 0, and when the value of the first coefficient value is 2, the modified value of the first coefficient level may be one of 0, 1, and 2.

The video encoding method may be performed in sub-block units.

The calculating of the difference value may include calculating the difference value by using a normalized R-D cost function.

According to an aspect of another embodiment, a video encoding apparatus includes: a rate-distortion (R-D) cost calculator configured to calculate a difference value between a rate-distortion (R-D) cost of a first coefficient level from among coefficient levels of a sub-block and an R-D cost of a second coefficient level adjacent to the first coefficient level by using a distortion difference calculated by using an integer of the first coefficient level and an integer of the second coefficient level and a rate variation between the first coefficient level and the second coefficient level; a coefficient level modifier configured to select one of the integer values of the first and second coefficient levels as a modified value of the first coefficient level based on the difference value; and a coefficient level outputter configured to output the modified value of the first coefficient level.

The R-D cost calculator may calculate a difference value of an R-D cost when a value of a coefficient level corresponding to a first sample position that is a position of a nonzero coefficient level generated last according to a forward scan order from among sample positions of the sub-block is modified to 0, and sequentially calculate difference values of R-D costs in a reverse scan order when values of coefficient levels corresponding to positions of nonzero coefficient levels existing after the first sample position are modified to 0 in the reverse scan order, and the video encoding apparatus may further include a last significant coefficient (LSC) determiner configured to search for a second sample position in which a value obtained by sequentially adding difference values of R-D costs of the sample positions according to the reverse scan order is lowest, and modify values of coefficient levels corresponding to sample positions before the second sample position to 0 according to the reverse scan order.

The LSC determiner may determine a coefficient level corresponding to the second sample position from among the coefficient levels as a last significant coefficient (LSC), and the video encoding apparatus may further include an LSC information encoder configured to encode information indicating a position of the LSC.

The LSC determiner may stop searching for the second sample position when a sample position in which a value of a coefficient level is equal to or higher than 2 is found.

The LCS determiner may calculate a lowest value of a prefix sum in a structure of a prefix tree, wherein the structure of the prefix tree may be a structure in which two sample positions adjacent in the reverse scan order are assigned as a pair and difference values of R-D costs corresponding to the two sample positions in the pair are sequentially added.

When a value of the first coefficient level is 0, the modified value of the first coefficient level is 0, and when the value of the first coefficient value is 2, the modified value of the first coefficient level may be one of 0, 1, and 2.

The modified value of the first coefficient level may be output in sub-block units.

The R-D cost calculator may calculate the difference value by using a normalized R-D cost function.

According to an aspect of another embodiment, a non-transitory computer-readable recording medium has recorded thereon a program, which when executed by a computer, performs the video encoding method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
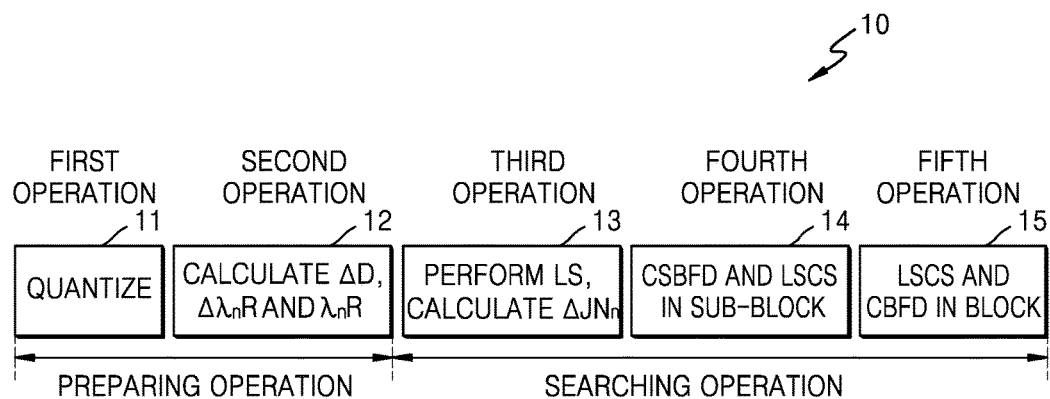
FIG. 1 is a diagram of a structure of a pipeline when rate-distortion optimization-based quantization is performed according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

In the following description, terms such as "unit" and "module" indicate a unit for processing at least one function or operation, wherein the unit and the block may be embodied as hardware or software or embodied by combining hardware and software.

In the following description, "one embodiment" or "an embodiment" denotes a particular feature, structure, or characteristic described together with an example included in at least one embodiment. Thus, "according to one embodiment" or "according to an embodiment" does not necessarily denote the same embodiment.

A technique of calculating a value of a coefficient level in consideration of a rate-distortion (R-D) optimization and searching for a last significant coefficient (LSC) according to various embodiments will be described with reference to FIGS. 1 through 5.

In addition, a video encoding technique and video decoding technique based on coding units having a tree structure according to various embodiments will be described with reference to FIGS. 6 through 25. Hereinafter, an 'image' may denote a still image or a moving image of a video, or a video itself.

A compression encoding process performed on image information by using a video encoding technique realizes high efficiency image compression by quantizing a transformation coefficient obtained by performing orthogonal transformation, such as discrete cosine transformation, on a prediction residual signal that is a residual between an input image and a prediction image on which motion compensation prediction or the like is performed, according to units of splitting the input image, and then entropy-encoding the quantized transformation coefficient.

At this time, when quantization is performed, a quantization noise is generated, and an image decoded by a decoder may have a distortion. However, by performing the quantization, an information amount to be encoded is reduced and thus high efficiency compression may be realized.

As such, an example of a technique used to select an encoding mode by evaluating a trade-off of a distortion and a rate (encoding amount) includes an R-D optimization technique.

In other words, when a plurality of encoding mode options are provided, a distortion D of a decoded image obtained when a certain encoding mode is selected, a rate (encoding amount) R generated when the certain encoding mode is selected, and an R-D cost J displayed as a Lagrange multiplier λ may be calculated. Here, by selecting an encoding mode in which the R-D cost J is lowest, encoding in which a trade-off between the rate R and the distortion D is optimum may be performed.

A video encoding method and apparatus according to an embodiment may perform R-D optimized quantization (RDOQ). RDOQ is a process of optimizing a quantized coefficient, and may be a technique performed in a reconstruction stage after a prediction stage and a transformation/quantization stage. Here, the video encoding method and apparatus according to an embodiment may calculate a value of a coefficient level included in a sub-block in consideration of R-D optimization, and determine an LSC.

A function of R-D cost generally used in HEVC reference module (HM) is represented in Equation 1 below.

$$J = D + \lambda \cdot R \qquad \text{[Equation 1]}$$

Here, J denotes an R-D cost, D denotes a distortion between an original image and a reconstruction image according to transformation and quantization, and R denotes a rate according to a bit length generated via encoding of a block. Also, λ denotes a Lagrange multiplier that is a coefficient depending from quantum and a parameter.

However, when the function of R-D cost represented by Equation 1 is used, complexity of calculation is increased, and thus it may be difficult to realize hardware. Accordingly, in order to reduce the complexity of calculation, a method of changing Equation 1 to a normalized function may be used. A normalized R-D cost function is obtained by dividing Equation 1 by $N(s) \cdot Q^2_{step}$, and $N(s)$ and $Q^2_{step}$ may be defined according to Equation 2 below.

$$N(s) = \frac{1}{2^{14-2s}} \qquad \text{[Equation 1]}$$

$$s = \log_2 TrSize$$

$$Q_{step} = 2^{7-s} \cdot 2^{\frac{QP-4}{6}}$$

In Equation 2, $Q_{step}$ denotes a quantization step size and is expressed by quantization parameter (QP), and $N(s)$ is a coefficient for indicating λ. Accordingly, the normalized R-D cost function may be converted to Equation 3 below.

$$J_n = (l_{fixed} - l_Q)^2 + \lambda_n \cdot R \qquad \text{[Equation 3]}$$

where $$\lambda_n = \alpha \cdot W_k \cdot 2^{-\frac{8}{3}}$$

$l_{fixed}$ denotes a value limiting a length of an integer and the number of decimal places of an actual value of a coefficient level to be suitable for hardware realization, and $l_Q$ denotes an integer value of each coefficient level. Also, α and $W_k$ are coefficients for indicating λ. By using the normalized R-D cost function of Equation 3, calculation of the distortion D is simplified and a dynamic range of λ is reduced. Also, the normalized R-D cost function may be calculated in a block unit instead of a coefficient unit. In this case, calculation operations may be simplified.

Also, a video encoding method and apparatus according to an embodiment may calculate a value of a coefficient level in a sub-block by performing R-D optimization in a sub-block unit, and determine an LSC. At this time, the normalized R-D cost function may be used to perform R-D optimization.

First, a technique of calculating a value of a coefficient level for R-D optimization and searching for an LSC will be described with reference to FIGS. 1 through 5.

FIG. 1 is a diagram of a structure of a pipeline 10 when R-D optimization-based quantization is performed according to an embodiment.

The pipeline 10 may include a preparing operation and a searching operation for performing R-D optimization-based quantization, wherein the preparing operation includes a first operation 11 and a second operation 12, and the searching operation includes third through fifth operations 13 through 15.

According to the structure of the pipeline 10 according to an embodiment, quantized coefficients may be received in a sub-block unit in the first operation 11. The pipeline 10 may receive not only quantized coefficients of a residual, but also information for encoding the residual, a QP, information about a scan direction, and a value of normalized λ.

In the second operation 12, the pipeline 10 may only perform calculation for deriving a difference value $\Delta J_n$ between R-D costs of coefficient levels, instead of calculating an R-D cost with respect to each of the quantized coefficients. In other words, the pipeline 10 may calculate a distortion difference $\Delta D_n$ between the coefficient levels and a rate variation $\Delta \lambda_n R$ between the coefficient levels before calculating the difference value $\Delta J_n$ between the R-D costs of the coefficient levels. The difference value $\Delta J_n$ may be calculated according to Equation 4 below.

$$\Delta J_n = \Delta D_n + \lambda_n \cdot \Delta R \qquad \text{[Equation 4]}$$

Also, the distortion difference $\Delta D_n$ may be calculated according to Equation 5 below.

$$\Delta D_n = (l_{fixed} - l_{Q0})^2 - (l_{fixed} - l_{Q1})^2, \text{ where } D_n = (l_{fixed} - l_Q)^2 \qquad \text{[Equation 5]}$$

$l_{fixed}$ denotes a value limiting a length of an integer and the number of decimal places of an actual value of a coefficient level to be suitable for hardware realization, and $l_{Q0}$ and $l_{Q1}$ denotes integer values of adjacent coefficient levels. When a video encoding apparatus according to an embodiment calculates $\Delta J_n$ instead of $J_n$ with respect to each coefficient level, a squaring operation of $l_{fixed}$ is not required, and thus a calculation operation may be simplified. Also, since a result value of the calculation is $\Delta J_n$ instead of $J_n$, and thus a range of the result value may be reduced.

In the third operation 13, the pipeline 10 may perform a level search by calculating $\Delta J_n$ through Equations 4 and 5. The level search is a process of modifying a value of each coefficient level to have a lowest cost based on the difference value $\Delta J_n$. A process of modifying a value of each coefficient level via a level search will be described with reference to FIG. 5B.

In the fourth operation 14, the pipeline 10 may determine a coded sub-block flag (Coded_Sub_Block_Flag) indicating whether a coefficient level having a value of at least 1 exists from among the coefficient levels in the sub-block, and may simultaneously search for a position of an LSC in the sub-block.

In the fifth operation 15, the pipeline 10 may determine a coded block flag (Coded_Block_Flag) indicating whether a coefficient level having a value of at least 1 exists from among coefficient values in a block including the sub-blocks, and may simultaneously search for a position of an LSC in the block.

Meanwhile, after the searching operation, a completion operation of the R-D optimization-based quantization may be performed. Since the difference value $\Delta J_n$ is prepared in the preparing operation, combination to sign data hiding may be very easy.

Figure 2:
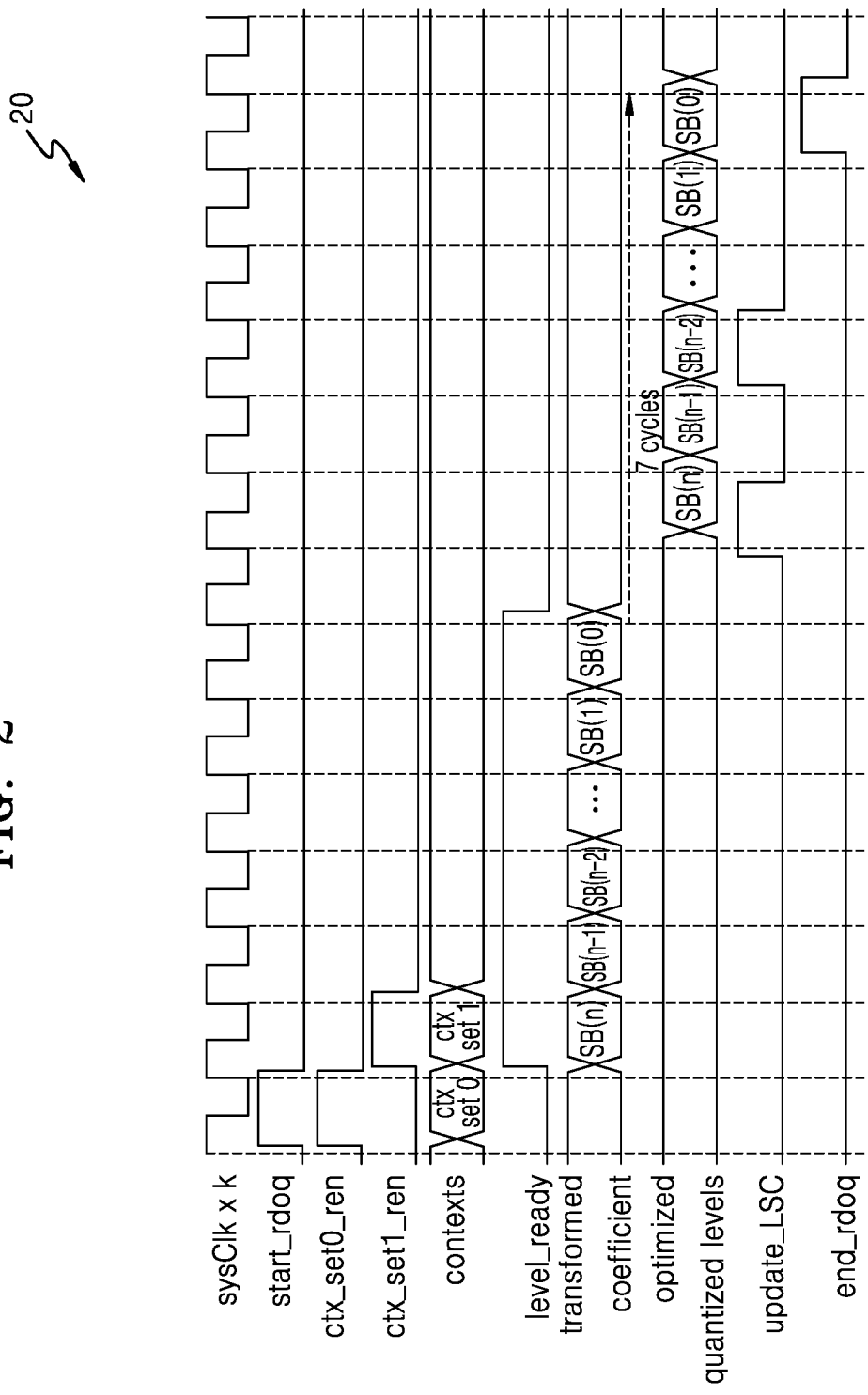
FIG. 2 is a timing diagram when rate-distortion optimization-based quantization is performed according to an embodiment.

FIG. 2 is a timing diagram 20 when R-D optimization-based quantization is performed according to an embodiment.

The R-D optimization-based quantization may start when an input block is received. When cases in which a bin is 0 and a bin is 1 are defined according to context, preparation for optimizing each coefficient level is ready. A video encoding apparatus 30 of FIG. 3A according to an embodiment may determine an optimized coefficient level of each of transformed coefficients by scanning the transformed coefficients in a reverse scan direction. A level searching operation for determining the optimized coefficient level may be performed in sub-block units. If a level searching operation is performed on a block larger than the sub-block (for example, 4×4), the level searching operation may be performed on a unit obtained by gathering several sub-blocks in a reverse scan direction.

The video encoding apparatus 30 according to an embodiment may perform a process of determining Coded_Sub_Block_Flag in the sub-block units immediately after the level searching operation is performed in the sub-block units. While determining Coded_Sub-Block_Flag, the video encoding apparatus 30 may compare an entire R-D cost of a sub-block and an R-D cost when all coefficient levels in the sub-block are 0, and select the lowest R-D cost. When optimized coefficient levels in the sub-block after the level searching operation is performed are all 0, Coded_Sub_Block_Flag is determined to be 0. If a current sub-block includes an LSC, Coded_Sub_Block_Flag may be determined to be 1. Also, if there is only one non-zero coefficient level in the sub-block at coordinates (0,0) of a coefficient level, an R-D cost of sig_coeff_flag corresponding to the coordinates (0,0) may be subtracted from a sum of all R-D costs.

The video encoding apparatus 30 according to an embodiment may combine an LSC searching operation and a Coded_Block_Flag determining operation. During the LSC searching operation, the video encoding apparatus 30 compares R-D costs with respect to LSCs corresponding to sample positions in a reverse scan order from a sample position where an LSC is positioned. Here, when a sample position in which a value of a coefficient level is at least two is found during a reverse scan, the LSC searching operation may be stopped and a coefficient level of a sample location having a lowest R-D cost may be selected as a position of the LSC. At this time, since the video encoding apparatus 30 compares R-D costs according to positions of LSCs by using an R-D cost when Coded_Block_Flag, which is pre-calculated, is 0, the LCS searching operation and the Coded_Block_Flag determining operation may be combined.

Figure 3A:
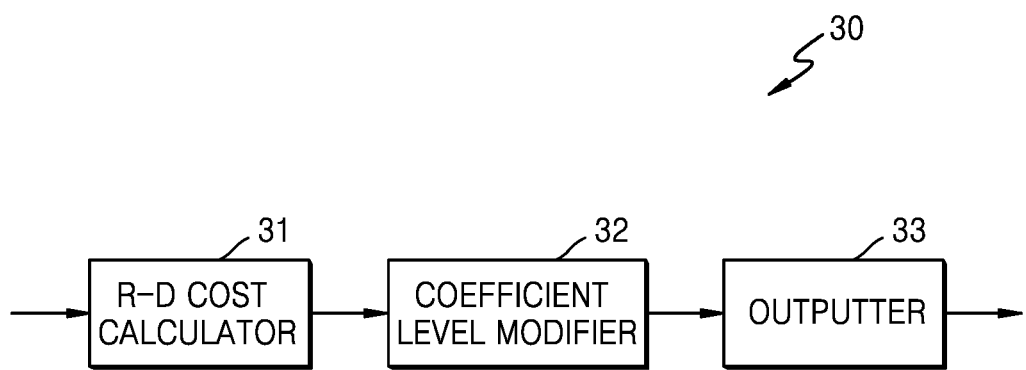
FIG. 3A is a block diagram of a video encoding apparatus according to an embodiment.

FIG. 3A is a block diagram of the video encoding apparatus 30 according to an embodiment.

Referring to FIG. 3A, the video encoding apparatus 30 according to an embodiment includes an R-D cost calculator 31, a coefficient level modifier 32, and an outputter 33.

The R-D cost calculator 31 according to an embodiment may calculate a difference value of R-D costs of coefficient levels in sub-block units. Here, when a difference value between an R-D cost of a first coefficient level and an R-D cost of a second coefficient level adjacent to the first coefficient level is calculated, a distortion difference calculated by using an integer value of the first coefficient level and an integer value of the second coefficient level is used. Also, while calculating the difference value, a rate variation between the first coefficient level and the second coefficient level is used. Here, the first coefficient level has a real number value and the second coefficient level has an integer value.

The coefficient level modifier 32 according to an embodiment may perform a level searching operation. In other words, the coefficient level modifier 32 may select one of the integer values of the first and second coefficient levels as a modified value of the first coefficient level, based on the difference value. Here, the first and second coefficient levels may be adjacent to each other. The level searching operation according to coefficient levels may be performed according to Table 1 below. During the to level searching operation, $\Delta J_{zero}$ be used during a Coded_Sub_Block_Flag (CSBF) determining operation and an LSC searching operation may also be calculated. Here, $\Delta J_{zero}$ denotes a difference value of R-D costs when a coefficient level $l_Q$ is modified to 0, and $\Delta J_{zero}$ may be calculated by the R-D cost calculator 31.

The outputter 33 according to an embodiment may output a result value of performing the level searching operation by the coefficient level modifier 32, i.e., output modified values of coefficient levels of a sub-block.

Figure 3B:
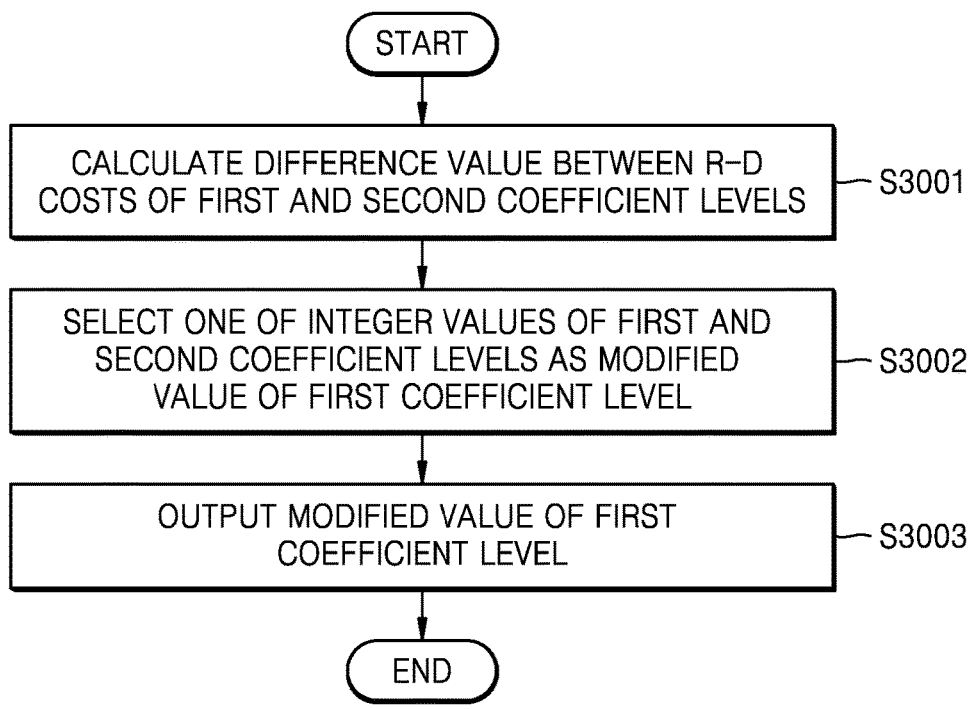
FIG. 3B is a flowchart of a video encoding method according to an embodiment.

FIG. 3B is a flowchart of a video encoding method according to an embodiment.

The video encoding method performed by the video encoding apparatus 30, according to an embodiment includes calculating the difference value between the R-D costs of the first and second coefficient levels (operation S3001), selecting one of the integer values of the first and second coefficient levels as the modified value of the first coefficient level (operation S3002), and outputting the modified value of the first coefficient level (operation S3003). Here, the difference value is calculated by using the distortion difference calculated by using the integer values of the first and second coefficient levels, and a rate variation between the first and second coefficient levels.

In detail, in operation S3001, the R-D cost calculator 31 according to an embodiment may calculate a difference value $\Delta J$ between the R-D costs. When $l_Q$ denotes a value of a coefficient level, the difference value $\Delta J$ may be calculated by comparing a current coefficient level and a modified coefficient level as shown in Table 1 below, according to $l_Q$.

TABLE 1

| Value of Coefficient Level | Coefficient Level Compared with Current Coefficient Level |
|---|---|
| 0 | 1 ≥ 0 |
| 1 | 1 ≥ 0 |
| 2 | 2 ≥ 0, 2 ≥ 1 |
| $I_Q > 2$ | $I_Q ≥ I_Q - 1$ |

The R-D cost calculator 31 according to an embodiment may calculate a difference value ΔJ generated when a value of a coefficient level is modified from 1 to 0, with respect to a value of a current coefficient level which is 0 or 1 from among coefficient levels of a sub-block. Also, the R-D cost calculator 31 may calculate and compare a difference value ΔJ generated when a value of a coefficient level is modified from 2 to 0 and a difference value ΔJ generated when a value of a coefficient level is modified from 2 to 1, with respect to a value of a current coefficient level which is 2. Also, the R-D cost calculator 31 may calculate a difference value ΔJ generated when a value of a coefficient level is modified to a value of a coefficient level, which is adjacent to and smaller than a value of a current coefficient level, with respect to a value of a current coefficient level which is higher than 2. As such, since the R-D cost calculator 31 compares R-D costs of two adjacent coefficient levels during the level searching operation, relationships as in Equations 6 and 7 are established.

$$l_{Q0} = l_{Q1} - 1 \quad \text{[Equation 6]}$$

$$\Delta D_n = 2 \cdot (l_{fixed} - l_{Q1}) + 1 \quad \text{[Equation 7]}$$

Also, as shown in Table 1, it is a principle to calculate a difference value ΔJ between two adjacent coefficient levels, but since the R-D cost calculator 31 also calculates a difference value ΔJ when a coefficient level is 0 exceptionally with respect to a coefficient level in which a value of a coefficient level is 2, and thus Equation 8 below is calculated.

$$\Delta D_n = 4 \cdot l_{fixed} - 4 \quad \text{[Equation 8]}$$

Meanwhile, since Equation 7 and a multiplication in Equation 7 are realized via a shift operation, $\Delta D_n$ may be calculated by only using an adder and a shifter.

Also, the R-D cost calculator 31 according to an embodiment may also calculate a difference value ΔJ when a coefficient level is 0 during the CSBF determining operation and the LSC searching operation. At this time, relationships as in Equations 9 and 10 are established.

$$l_{Q0} = 0 \quad \text{[Equation 9]}$$

$$\Delta D_n = -l_{Q1}^2 + 2 \cdot l_{fixed} \cdot l_{Q1} \quad \text{[Equation 10]}$$

The LSC searching operation may stop when a coefficient level in which $l_{Q1}$ is higher than 2. In this case, since an R-D cost is calculated only when $l_{Q1}$ is 2, only calculation of Equation 11 may be performed, and a value obtained at this time is the same as $\Delta D_n$ when $l_{Q1}$ is 1 during the level searching operation.

$$\Delta D_n = 2 \cdot l_{fixed} - 1 \text{ [when } l_{Q1} = 1 \text{]} \quad \text{[Equation 11]}$$

A process of obtaining a value required during calculations for the level searching operation will now be described.

The R-D cost calculator 31 according to an embodiment may calculate a rate variation $\Delta \lambda_n R$ between coefficient levels. For example, $\lambda_n R$ of each coefficient level may be calculated based on whether comparison targets of coefficient levels are 0 and 1, 1 and 2, 2 and 3, etc., and then $\Delta \lambda_n R$ may be derived. Here, $\Delta \lambda_n R$ is calculated while distinguishing $\Delta \lambda_n R_{flag}$ related to sig_coeff_flag (SCF), coeff_abs_level_greater1_flag (CAL_G1F), coeff_abs_level_greater2_flag (CAL_G2F), and coeff_sign_flag, and $\Delta \lambda_n R_{CAL\_REM}$ of coeff_abs_level_remaining (CAL_REM) as in Equation 12 below.

$$\Delta \lambda_n R = \Delta \lambda_n R_{flag} + \Delta \lambda_n R_{CAL\_REM} \quad \text{[Equation 12]}$$

SCF is a syntax element having a value of 1 when a coefficient level has a value higher than 0, CAL_G1F is a syntax element having a value of 1 when an absolute value of a coefficient level is higher than 1, and CAL_G2F is a syntax element having a value of 1 when an absolute value of a coefficient level is higher than 2. Also, coeff_sign_flag is a syntax element having a value of 1 when a coefficient level has a negative value and is 0 when a coefficient level has a positive value, and CAL_REM is a syntax element indicating a difference value of a base level and an absolute value of a coefficient level. $\Delta \lambda_n R_{flag}$ related to SCF, CAL_G1F, CAL_G2F, and coeff_sign_flag may be calculated excluding a part commonly generated according to a value of each coefficient level.

Figure 4A:
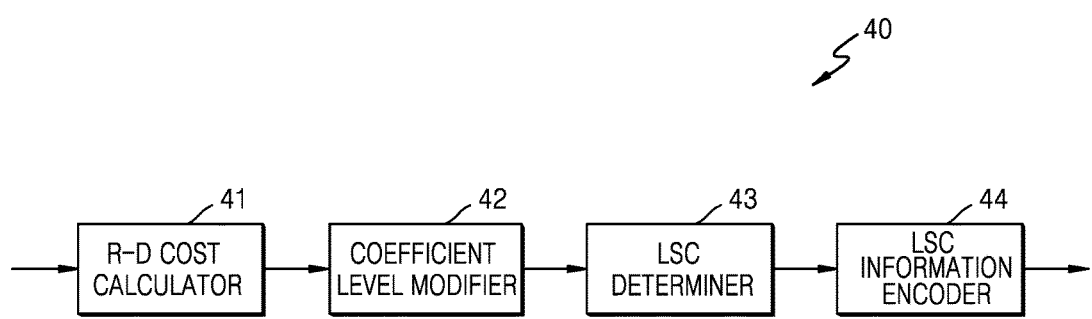
FIG. 4A is a block diagram of a video encoding apparatus according to another embodiment.

FIG. 4A is a block diagram of a video encoding apparatus 40 according to another embodiment.

Referring to FIG. 4A, the video encoding apparatus 40 includes an R-D cost calculator 41, a coefficient level modifier 42, an LSC determiner 43, and an LSC information encoder 44. The R-D cost calculator 41 and the coefficient level modifier 42 of the video encoding apparatus 40 respectively correspond to the R-D cost calculator 31 and the coefficient level modifier 32 of FIG. 3A, and thus overlapping descriptions are not provided again.

The LSC determiner 43 may search for a sample position in which a sum obtained by sequentially adding $\Delta J_{zero}$ of sample positions in a reverse scan order is the lowest. Also, the LSC determiner 43 may modify values of coefficient levels corresponding to sample positions before a found sample position to 0 in the reverse scan order. Also, the LSC determiner 43 may determine a coefficient level corresponding to the found sample position as an LSC.

The LSC determiner 43 according to an embodiment may be realized as hardware by using a structure of a prefix tree in order to improve efficiency of searching for an LSC. The LSC determiner 43 may include a logic that no longer updates an LSC when a sample position in which a value of a coefficient level is at least 2. The structure of the prefix tree will be described later with reference to FIG. 5.

The LSC information encoder 44 may encode information indicating a position of the LSC determined by the LSC determiner 43.

Figure 4B:
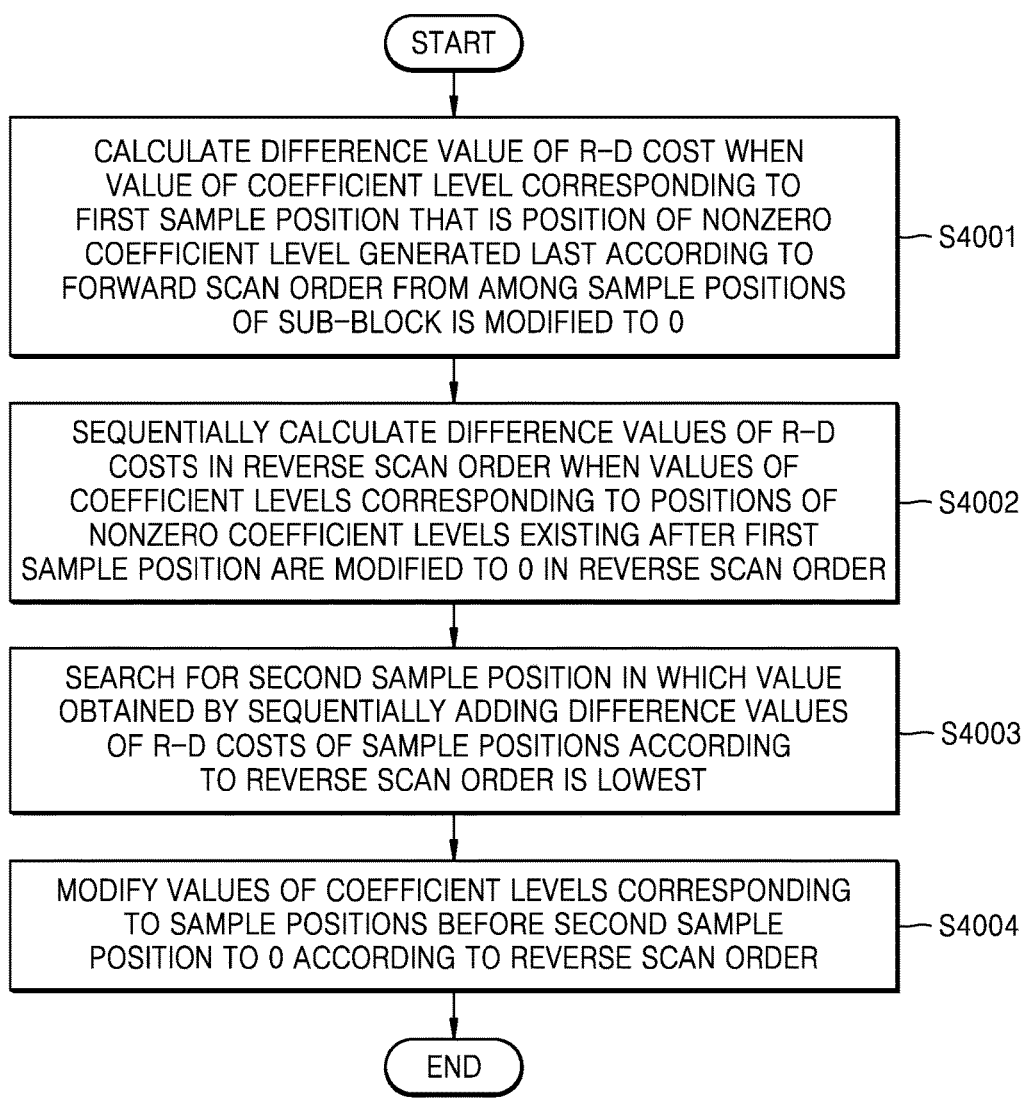
FIG. 4B is a flowchart of a video encoding method according to another embodiment.

FIG. 4B is a flowchart of a video encoding method according to another embodiment.

The video encoding method performed by the video encoding apparatus 40 according to an embodiment includes calculating a difference value calculating a difference value of an R-D cost when a value of a coefficient level corresponding to a first sample position that is a position of a nonzero coefficient level generated last according to a forward scan order from among sample positions of the sub-block is modified to 0 (operation S4001), sequentially calculating difference values of R-D costs in a reverse scan order when values of coefficient levels corresponding to positions of nonzero coefficient levels existing after the first sample position are modified to 0 in the reverse scan order (operation S4002), searching for a second sample position in which a value obtained by sequentially adding difference values of R-D costs of the sample positions according to the reverse scan order is lowest (operation S4003), and modifying values of coefficient levels corresponding to sample positions before the second sample position to 0 according to the reverse scan order.

The video encoding apparatus 40 may use a result value obtained by sequentially adding $\Delta J_{zero}$ of coefficient levels calculated during a level searching operation to determine a CSBF. The video encoding apparatus 40 may determine whether a sub-block is a zero sub-block by comparing R-D costs of Equation 13 and Equation 14.

$$J_{csbf=1} = \lambda_n R_{csbf=1}$$ [Equation 13]

$$J_{csbf=0} = \sum_{k=0}^{15} \Delta J_{zero}[k] + \lambda_n R_{csbf=0}$$ [Equation 14]

The video encoding apparatus 40 according to an embodiment may compare $J_{csbf=1}$ and $J_{csbf=0}$ to determine that a CSBF having a smaller value is a CSBF of a current sub-block.

The R-D cost calculator 41 may calculate $\Delta J_{zero}$ (or $\Delta J[n]$) generated when the value of the coefficient level corresponding to the first sample position that is the position of the nonzero coefficient level generated last according to the forward scan order from among the sample positions of the sub-block is modified to 0. Here, the difference value $\Delta J[n]$ between $J[n]$ of the first sample position and $J[n-1]$ of an adjacent sample position after the first sample position in the reverse scan order may be calculated by using $\Delta D_{zero}$ generated when a value of a coefficient level corresponding to each sample position is modified to 0. In other words, $\Delta J[n]$ may be defined according to Equation 15.

$$\Delta J[n] = J[n] - J[n-1] = (\Delta D_{zero}[n] + \lambda_n R_{OTHER}[n]) + (\lambda_n R_{LSC}[n] - \lambda_n R_{LSC}[n-1]) + (\lambda_n R_{SCF}[n-1] - \lambda_n R_{SCF}[n])$$ [Equation 15]

In Equation 15, $\Delta D_{zero}$ denotes a distortion variation when a value of a coefficient level on which a level searching operation is performed is modified to 0. Also, $\Delta \lambda_n R_{LSC}[n]$ is $\lambda_n R$ of an LSC of a coefficient level of an $n^{th}$ sample position. Also, $\lambda_n R_{SCF}[n]$ is $\lambda_n R$ of SCF of a coefficient level on which the level searching operation is performed. Also, $\lambda_n R_{OTHER}[n]$ is $\lambda_n R$ of CAL_G1F, CAL_G2F, CAL_REM, and coeff_sign_flag other than SCF.

Hereinafter, a process of obtaining modified values of coefficient levels, according to an embodiment will be described.

A level searching operation may vary according to values of coefficient levels. While obtaining modified values of coefficient levels, $\Delta J$ described above is basically used.

When $1_Q$ is 0, an optimized value of a coefficient level may be 0.

When $1_Q$ is 1, an optimized value of a coefficient level may be determined according to a sign of $\Delta J$ when a value of the coefficient level is modified to 0. In other words, when $\Delta J$ obtained when a value of a coefficient level that is a target of a current level searching operation is modified from 1 to 0 is equal to or higher than 0, an optimized value of a coefficient level is 1, and in other cases, an optimized value of a coefficient level may be 0.

When $1_Q$ is 2, an optimized value of a coefficient level is 1 when $\Delta J$ obtained when a value of a coefficient level is modified from 2 to 1 is lower than 0, and an optimized value of a coefficient level may be 2 in other cases. Meanwhile, when $1_Q$ is 2, an optimized value of a coefficient level may be 2 when $\Delta J$ obtained when a value of a coefficient level is modified from 2 to 1 is equal to or higher than 0 and when $\Delta J$ obtained when a value of a coefficient level is modified from 2 to 0 is equal to or higher than 0. An optimized value of a coefficient level may be 1 when $\Delta J$ obtained when a value of a coefficient level is modified from 2 to 1 is lower than 0, and when $\Delta J$ obtained when a value of a coefficient level is modified from 2 to 0 is higher than $\Delta J$ obtained when a value of a coefficient level is modified from 2 to 1. In other cases, an optimized value of a coefficient level may be 0. It is a principle to calculate $\Delta J$ between two adjacent coefficient levels during a level searching operation, but when a value of a coefficient level is 2, $\Delta J$ may be exceptionally calculated with respect to a coefficient level having a value of 0.

When $1_Q$ is higher than 2, an optimized value of a coefficient level is $1_Q$ when $\Delta J$ obtained when a value of a coefficient level is modified from $1_Q$ to $1_{Q-1}$ is equal to or higher than 0, and an optimized value of a coefficient level may be $1_{Q-1}$ in other cases.

Figure 5:
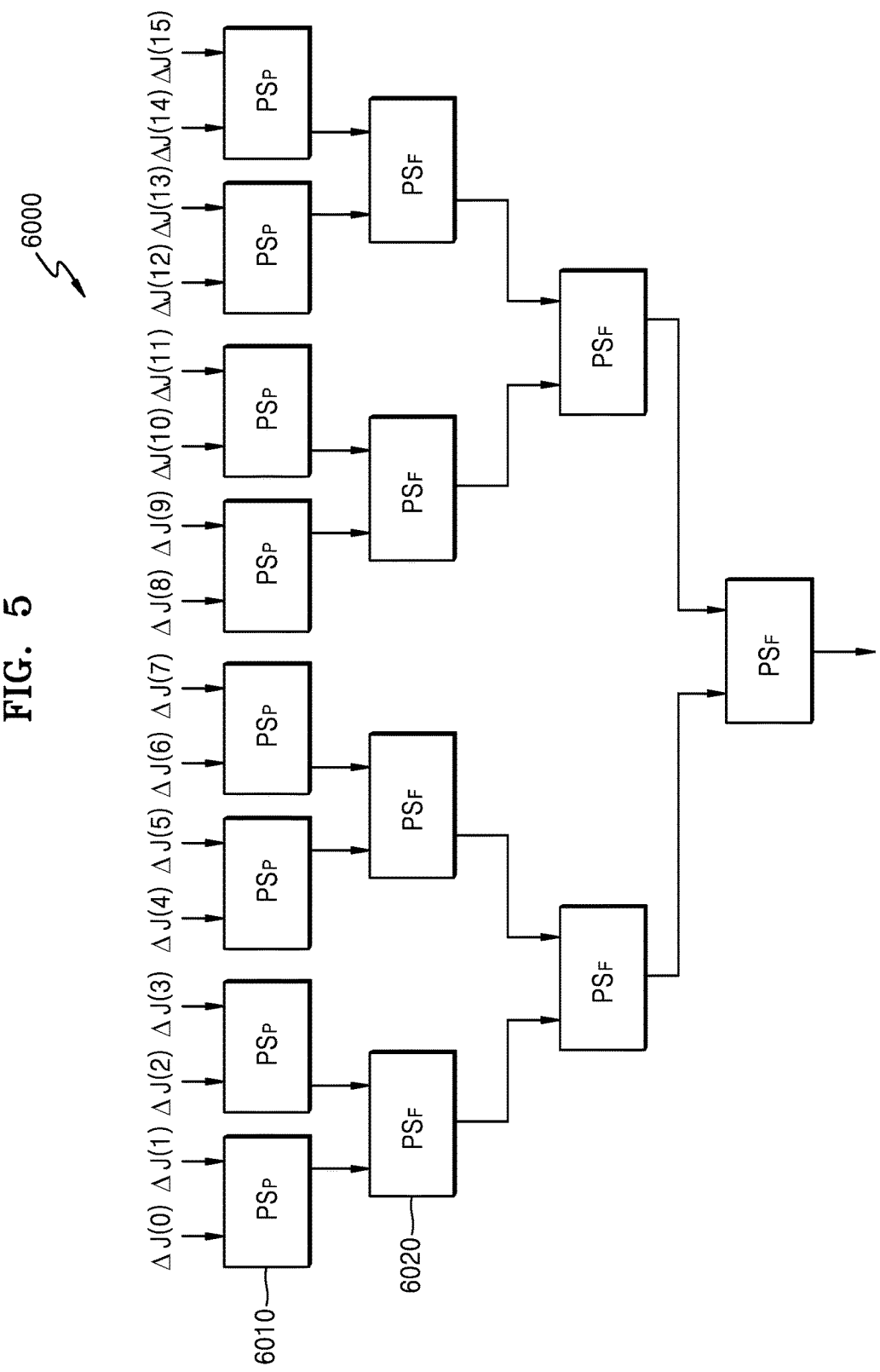
FIG. 5 is a diagram of a structure of a prefix tree for searching for a last significant coefficient, according to an embodiment.

FIG. 5 is a diagram of a structure of a prefix tree 6000 for searching for an LSC, according to an embodiment.

The prefix tree 6000 according to an embodiment is a hardware block used while realizing a video encoding method in hardware. The prefix tree 6000 has a structure for searching for a sample position having the lowest sum when sixteen $\Delta J$ corresponding to sample positions in a sub-block are sequentially added in a reverse scan order while searching for an LSC. Referring to FIG. 5, in the prefix tree 6000, $\Delta J$ of two adjacent sample positions are assigned as one pair and are added, and at this time, a partial position selector 6010 is used. Also, in other adding operations, a full position selector 6020 is used.

If an LSC is searched for via a simple adder chain without using the prefix tree 6000 according to an embodiment, 16 sequential adders are required while realizing hardware, and thus a critical path may become very long. Accordingly, hardware may be efficiently realized if a value and a position in which a sum of R-D costs is the lowest are found in a tree structure by grouping sample positions by two.

Meanwhile, an algorithm described above may be expandably applied not only to HEVC, but also to an arbitrary standard.

Hereinafter, a video encoding technique and a video decoding technique based on coding units having a tress structure, according to various embodiments, will be described with reference to FIGS. 6 through 25.

Figure 6:
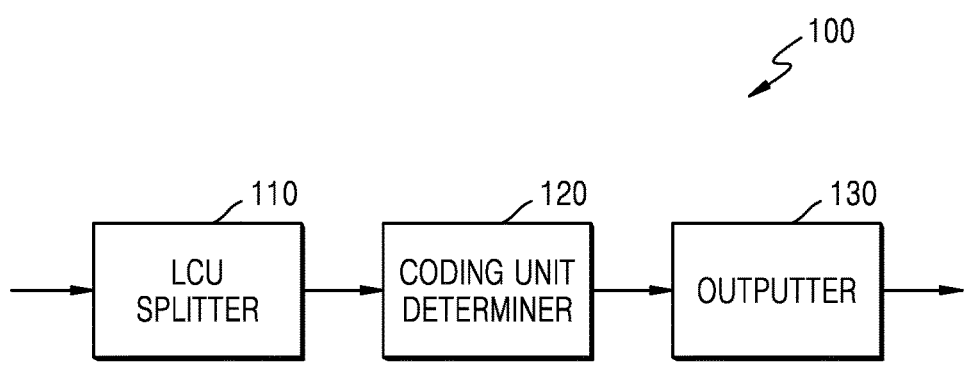
FIG. 6 is a block diagram of a video encoding apparatus based on coding units according to a tree structure, according to an embodiment.

FIG. 6 is a block diagram of a video encoding apparatus 100 based on coding units according to a tree structure, according to an embodiment. The video encoding apparatus 100 of FIG. 6 may correspond to the video encoding apparatus 30 or 40 of FIG. 3A or 4A described above, wherein the R-D cost calculator 31, the coefficient level modifier 32, and the outputter 33 of the video encoding apparatus 30, or the R-D cost calculator 41, the coefficient level modifier 42, the LSC determiner 43, and the LSC information encoder 44 of the video encoding apparatus 40 are included in a coding unit determiner 120 to perform their functions.

The video encoding apparatus 100 involving video prediction based on coding units according to a tree structure includes a largest coding unit (LCU) splitter 110, the coding unit determiner 120, and an outputter 130.

The LCU splitter 110 may split a current picture based on a LCU that is a coding unit having a maximum size for a current picture of an image. If the current picture is larger than the LCU, image data of the current picture may be split into the at least one LCU. The LCU according to one or more embodiments may be a data unit having a size of 32×32, 64×64, 128×128, 256×256, etc., wherein a shape of the data unit is a square having a width and length in squares of 2. The image data may be output to the coding unit determiner 120 according to the at least one LCU.

A coding unit according to one or more embodiments may be characterized by a maximum size and a depth. The depth denotes the number of times the coding unit is spatially split from the LCU, and as the depth deepens, deeper coding units according to depths may be split from the LCU to a smallest coding unit (SCU). A depth of the LCU is an uppermost depth and a depth of the SCU is a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to one or more embodiments is split according to depths, the image data of the space domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output a finally encoded image data according to the at least one split region. In other words, the coding unit determiner 120 determines a depth by encoding the image data in the deeper coding units according to depths, according to the LCU of the current picture, and selecting a depth having the least encoding error. The determined depth and the encoded image data according to the determined depth are output to the outputter 130.

The image data in the LCU is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the depths may differ according to regions in the image data. Thus, one or more depths may be determined in one LCU, and the image data of the LCU may be divided according to coding units of at least one depth.

Accordingly, the coding unit determiner 120 may determine coding units having a tree structure included in the LCU. The 'coding units having a tree structure' according to one or more embodiments include coding units corresponding to a depth determined to be the depth, from among all deeper coding units included in the LCU. A coding unit of a depth may be hierarchically determined according to depths in the same region of the LCU, and may be independently determined in different regions. Similarly, a depth in a current region may be independently determined from a depth in another region.

A maximum depth according to one or more embodiments is an index related to the number of splitting times from a LCU to an SCU. A first maximum depth according to one or more embodiments may denote the total number of splitting times from the LCU to the SCU. A second maximum depth according to one or more embodiments may denote the total number of depth levels from the LCU to the SCU. For example, when a depth of the LCU is 0, a depth of a coding unit, in which the LCU is split once, may be set to 1, and a depth of a coding unit, in which the LCU is split twice, may be set to 2. Here, if the SCU is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. For convenience of description, the prediction encoding and the transformation will now be described based on a coding unit of a current depth, in a LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residues in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a depth requires not only information about the depth, but also about information related to prediction encoding and transformation. Accordingly, the coding unit determiner 120 not only determines a depth having a least encoding error, but also determines a partition mode in a prediction unit, a prediction mode according to prediction units, and a size of a transformation unit for transformation.

Coding units according to a tree structure in a LCU and methods of determining a prediction unit/partition, and a transformation unit, according to one or more embodiments, will be described in detail below with reference to FIGS. 6 through 18.

The coding unit determiner 120 may measure an encoding error of deeper coding units according to depths by using R-D optimization based on Lagrangian multipliers.

The outputter 130 outputs the image data of the LCU, which is encoded based on the at least one depth determined by the coding unit determiner 120, and information about the encoding mode according to the depth, in bitstreams.

The encoded image data may be obtained by encoding residues of an image.

The information about the encoding mode according to depth may include information about the depth, about the partition mode in the prediction unit, the prediction mode, and the size of the transformation unit.

The information about the depth may be defined by using splitting information according to depths, which indicates whether encoding is performed on coding units of a lower depth instead of a current depth. If the current depth of the current coding unit is the depth, image data in the current coding unit is encoded and output, and thus the splitting information may be defined not to split the current coding unit to a lower depth. Alternatively, if the current depth of the current coding unit is not the depth, the encoding is performed on the coding unit of the lower depth, and thus the splitting information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and information about at least one encoding mode is determined for a coding unit of a depth, information about at least one encoding mode may be determined for one LCU. Also, a depth of the image data of the LCU may be different according to locations since the image data is hierarchically split according to depths, and thus splitting information may be set for the image data.

Accordingly, the outputter 130 may assign corresponding splitting information to at least one of the coding unit, the prediction unit, and a minimum unit included in the LCU.

The minimum unit according to one or more embodiments is a square data unit obtained by splitting the SCU constituting the lowermost depth by 4. Alternatively, the minimum unit according to an embodiment may be a maximum square data unit that may be included in all of the coding units, prediction units, partition units, and transformation units included in the LCU.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The outputter 130 may encode and output SAO parameters related to the SAO operation described above with reference to FIGS. 1 through 14.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 7:
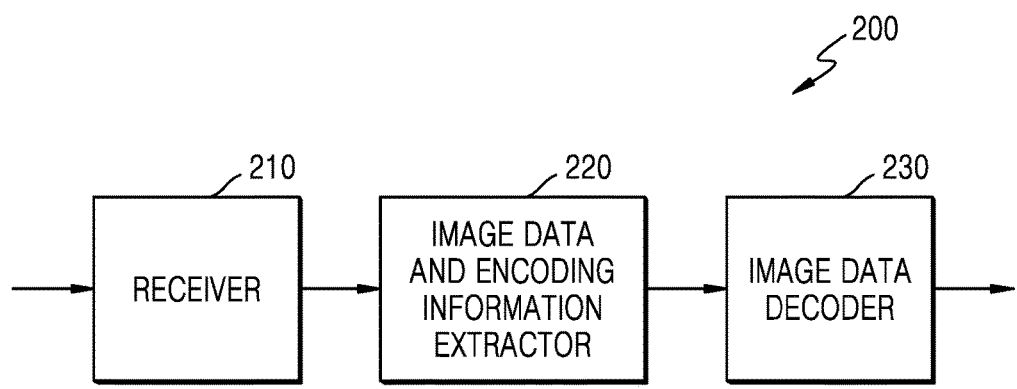
FIG. 7 is a block diagram of a video decoding apparatus based on coding units according to a tree structure, according to an embodiment.

FIG. 7 is a block diagram of a video decoding apparatus 200 based on coding units having a tree structure, according to one or more embodiments.

The video decoding apparatus 200 that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 are identical to those described with reference to FIG. 6 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts splitting information and encoding information for the coding units having a tree structure according to each LCU, from the parsed bitstream. The extracted splitting information and encoding information are output to the image data decoder 230. In other words, the image data in a bit stream is split into the LCU so that the image data decoder 230 decodes the image data for each LCU.

The splitting information and encoding information according to the LCU may be set for at least one piece of splitting information corresponding to the depth, and encoding information according to the depth may include information about a partition mode of a corresponding coding unit corresponding to the depth, information about a prediction mode, and splitting information of a transformation unit. Also, splitting information according to depths may be extracted as the information about a final depth.

The splitting information and the encoding information according to each LCU extracted by the image data and encoding information extractor 220 is splitting information and encoding information determined to generate a minimum encoding error when an encoder, such as the video encoding apparatus 100, repeatedly performs encoding for each deeper coding unit according to depths according to each LCU. Accordingly, the video decoding apparatus 200 may reconstruct an image by decoding the image data according to a depth and an encoding mode that generates the minimum encoding error.

Since the splitting information and the encoding information may be assigned to a predetermined data unit from among a corresponding coding unit, a prediction unit, and a minimum unit, the image data and encoding information extractor 220 may extract the splitting information and the encoding information according to the predetermined data units. If splitting information and encoding information of a corresponding LCU are recorded according to predetermined data units, the predetermined data units to which the same splitting information and encoding information are assigned may be inferred to be the data units included in the same LCU.

The image data decoder 230 reconstructs the current picture by decoding the image data in each LCU based on the splitting information and the encoding information according to the LCUs. In other words, the image data decoder 230 may decode the encoded image data based on the extracted information about the partition mode, the prediction mode, and the transformation unit for each coding unit from among the coding units having the tree structure included in each LCU. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each LCU. Via the inverse transformation, a pixel value of the space domain of the coding unit may be reconstructed.

The image data decoder 230 may determine a final depth of a current LCU by using splitting information according to depths. If the splitting information indicates that image data is no longer split in the current depth, the current depth is the final depth. Accordingly, the image data decoder 230 may decode encoded data in the current LCU by using the information about the partition mode of the prediction unit, the information about the prediction mode, and the splitting information of the transformation unit for each coding unit corresponding to the depth.

In other words, data units containing the encoding information including the same splitting information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Figure 8:
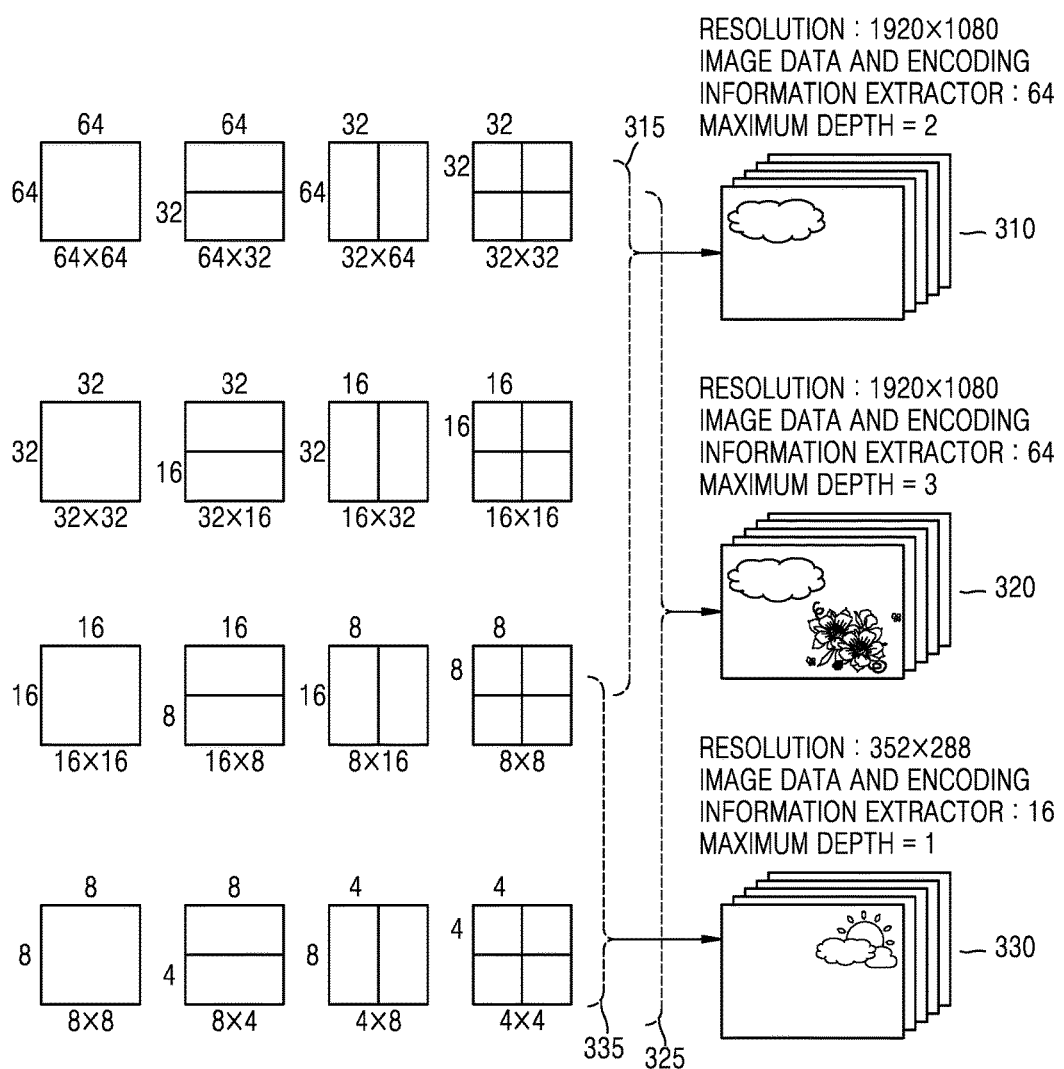
FIG. 8 is a diagram for describing a concept of coding units according to an embodiment.

FIG. 8 is a diagram for describing a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 17 denotes a total number of splits from a LCU to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a LCU having a long axis size of 64, and coding units having long axis sizes of 32 and 16 since depths are deepened to two layers by splitting the LCU twice. Since the maximum depth of the video data 330 is 1, coding units 335 of the video data 330 may include a LCU having a long axis size of 16, and coding units having a long axis size of 8 since depths are deepened to one layer by splitting the LCU once.

Since the maximum depth of the video data 320 is 3, coding units 325 of the video data 320 may include a LCU having a long axis size of 64, and coding units having long axis sizes of 32, 16, and 8 since the depths are deepened to 3 layers by splitting the LCU three times. As a depth deepens, detailed information may be precisely expressed.

Figure 9:
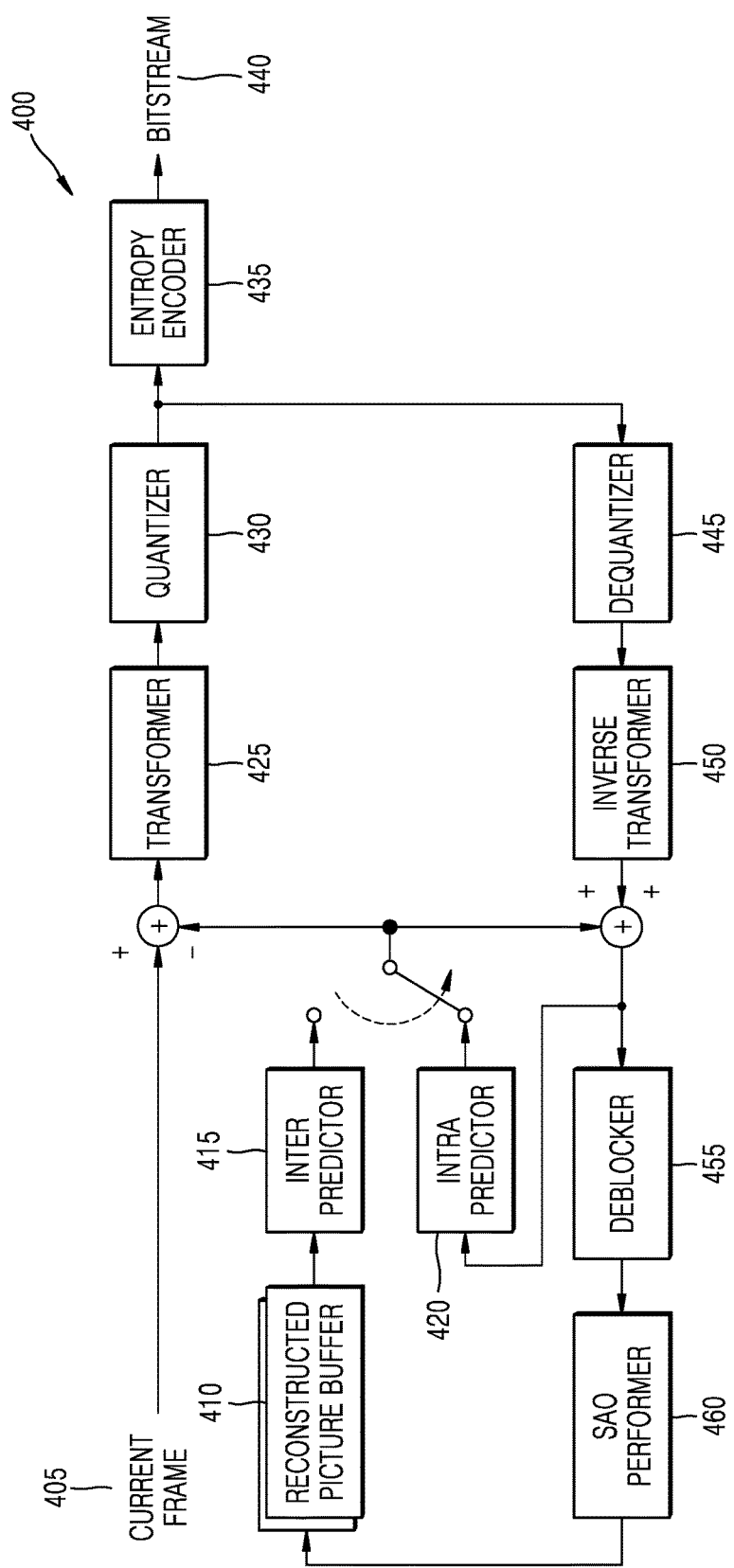
FIG. 9 is a block diagram of an image encoder based on coding units, according to an embodiment.

FIG. 9 is a block diagram of an image encoder 400 based on coding units, according to one or more embodiments.

The image encoder 400 performs operations necessary for encoding image data in the coding unit determiner 120 of the video encoding apparatus 100. In other words, an intra predictor 420 performs intra prediction on coding units in an intra mode according to prediction units, from among a current frame 405, and an inter predictor 415 performs inter prediction on coding units in an inter mode by using a current image 405 and a reference image obtained from a reconstructed picture buffer 410 according to prediction units. The current image 405 may be split into LCUs and then the LCUs may be sequentially encoded. In this regard, the LCUs that are to be split into coding units having a tree structure may be encoded.

Residue data is generated by removing prediction data regarding coding units of each mode that is output from the intra predictor 420 or the inter predictor 415 from data regarding encoded coding units of the current image 405, and is output as a quantized transformation coefficient according to transformation units through a transformer 425 and a quantizer 430. The quantized transformation coefficient is reconstructed as the residue data in a space domain through a dequantizer 445 and an inverse transformer 450. The reconstructed residue data in the space domain is added to prediction data for coding units of each mode that is output from the intra predictor 420 or the inter predictor and thus is reconstructed as data in a space domain for coding units of the current image 405. The reconstructed data in the space domain is generated as reconstructed images through a de-blocker 455 and an SAO performer 460 and the reconstructed images are stored in the reconstructed picture buffer 410. The reconstructed images stored in the reconstructed picture buffer 410 may be used as reference images for inter prediction of another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the dequantizer 445, the inverse transformer 450, the de-blocker 455, and the SAO performer 460, perform operations based on each coding unit among coding units having a tree structure according to each LCU.

Specifically, the intra predictor 420 and the inter predictor 415 may determine a partition mode and a prediction mode of each coding unit among the coding units having a tree structure in consideration of a maximum size and a maximum depth of a current LCU, and the transformer 425 may determine whether to split a transformation unit having a quad tree structure in each coding unit among the coding units having a tree structure.

Figure 10:
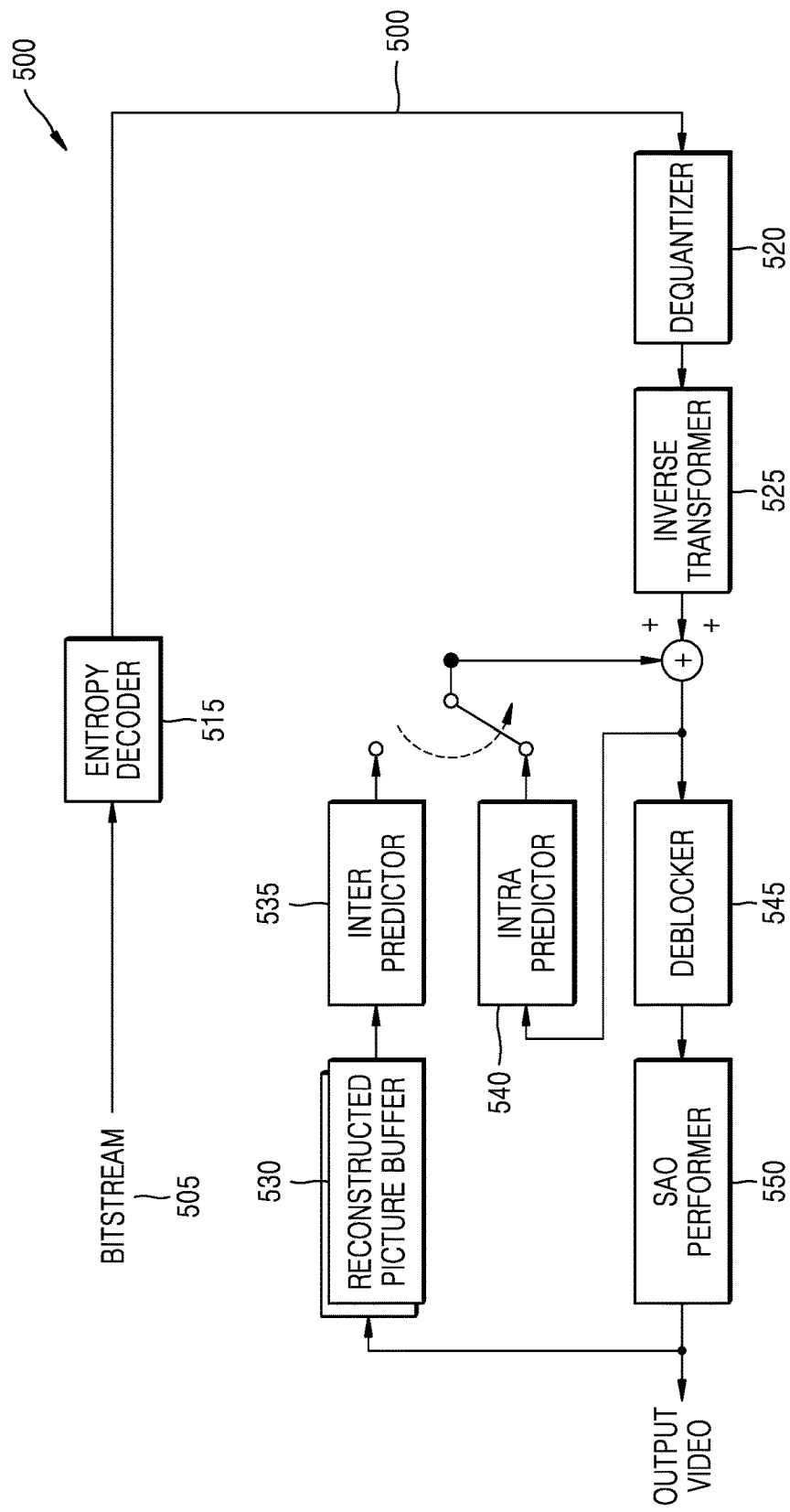
FIG. 10 is a block diagram of an image decoder based on coding units, according to an embodiment.

FIG. 10 is a block diagram of an image decoder 500 based on coding units, according to one or more embodiments.

An entropy decoder 515 parses encoded image data to be decoded and information about encoding required for decoding from a bitstream 505. The encoded image data is a quantized transformation coefficient from which residue data is reconstructed by a dequantizer 520 and an inverse transformer 525.

An intra predictor 540 performs intra prediction on coding units in an intra mode according to each prediction unit. An inter predictor 535 performs inter prediction on coding units in an inter mode from among the current image 405 for each prediction unit by using a reference image obtained from a reconstructed picture buffer 530.

Prediction data and residue data regarding coding units of each mode, which passed through the intra predictor 540 and the inter predictor 535, are summed, and thus data in a space domain regarding coding units of the current image 405 may be reconstructed, and the reconstructed data in the space domain may be output as a reconstructed image 560 through a de-blocker 545 and an SAO performer 550. Reconstructed images stored in the reconstructed picture buffer 530 may be output as reference images.

In order to decode the image data in the image data decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the dequantizer 520, the inverse transformer 525, the inter predictor 535, the de-blocker 545, and the SAO performer 550 may perform operations based on coding units having a tree structure for each LCU.

In particular, the SAO performer 550 and the inter predictor 535 may determine a partition and a prediction mode for each of the coding units having a tree structure, and the inverse transformer 525 may determine whether to split a transformation unit having a quad tree structure for each of the coding units.

Figure 11:
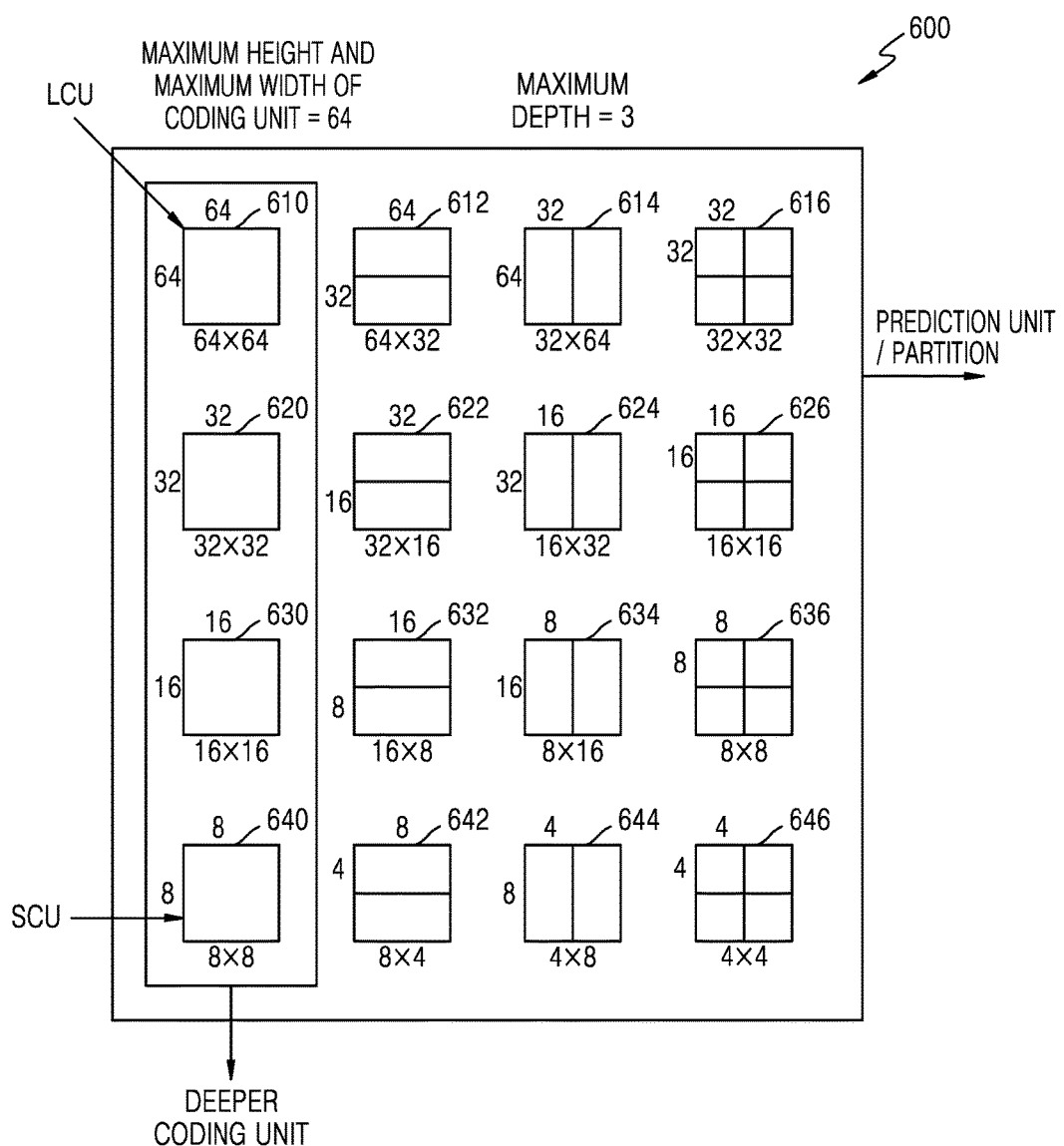
FIG. 11 is a diagram illustrating deeper coding units and partitions, according to an embodiment.

FIG. 11 is a diagram illustrating deeper coding units according to depths, and partitions, according to one or more embodiments.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to one or more embodiments, the maximum height and the maximum width of the coding units are each 64, and the maximum depth is 3. In this case, the maximum depth refers to a total number of times the coding unit is split from the LCU to the SCU. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a LCU in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 4×4 and a depth of 3 is an SCU.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine a final depth of the coding units constituting the LCU 610, the coding unit determiner 120 of the video encoding apparatus 100 performs encoding for coding units corresponding to each depth included in the LCU 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the final depth and a partition mode of the coding unit 610.

Figure 12:
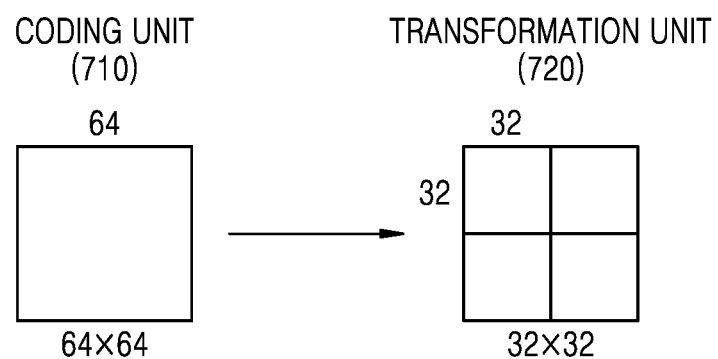
FIG. 12 is a diagram for describing a relationship between a coding unit and transformation units, according to an embodiment.

FIG. 12 is a diagram for describing a relationship between a coding unit 710 and transformation units 720, according to one or more embodiments.

The video encoding apparatus 100 or the video decoding apparatus 200 encodes or decodes an image according to coding units having sizes smaller than or equal to a LCU for each LCU. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 13:
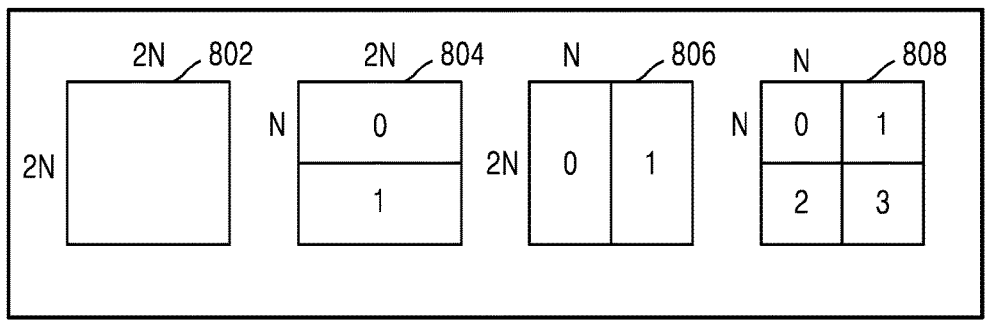
FIG. 13 is a diagram for describing encoding information of coding units, according to an embodiment.
Figure 13:
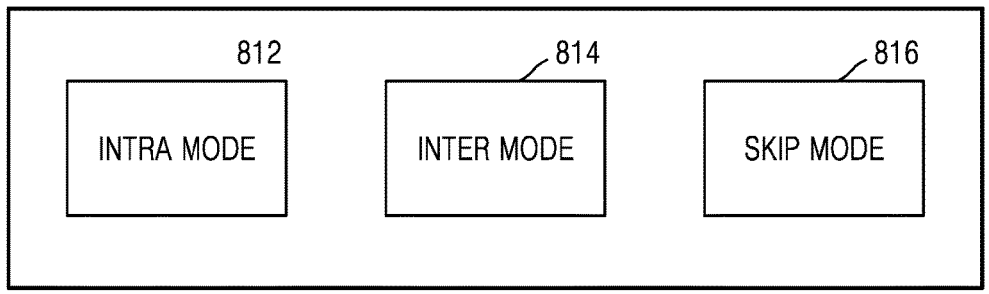
Figure 13:
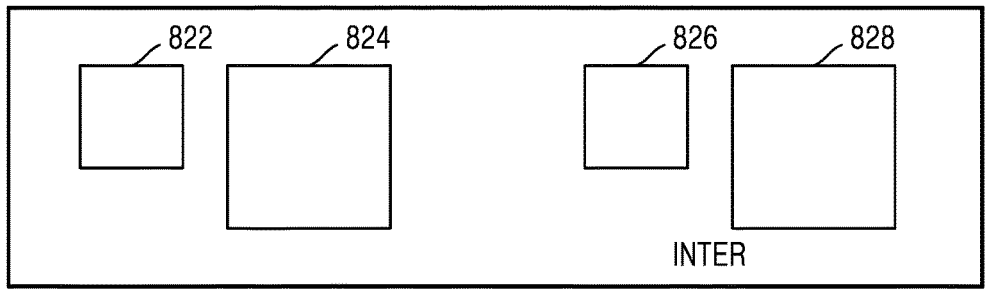

FIG. 13 is a diagram fro describing encoding information of coding units corresponding to a depth, according to one or more embodiments.

The outputter 130 of the video encoding apparatus 100 may encode and transmit information 800 about a partition mode, information 810 about a prediction mode, and information 820 about a size of a transformation unit for each coding unit corresponding to a final depth, as information about an encoding mode.

The information 800 indicates information about a mode of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition mode is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 14:
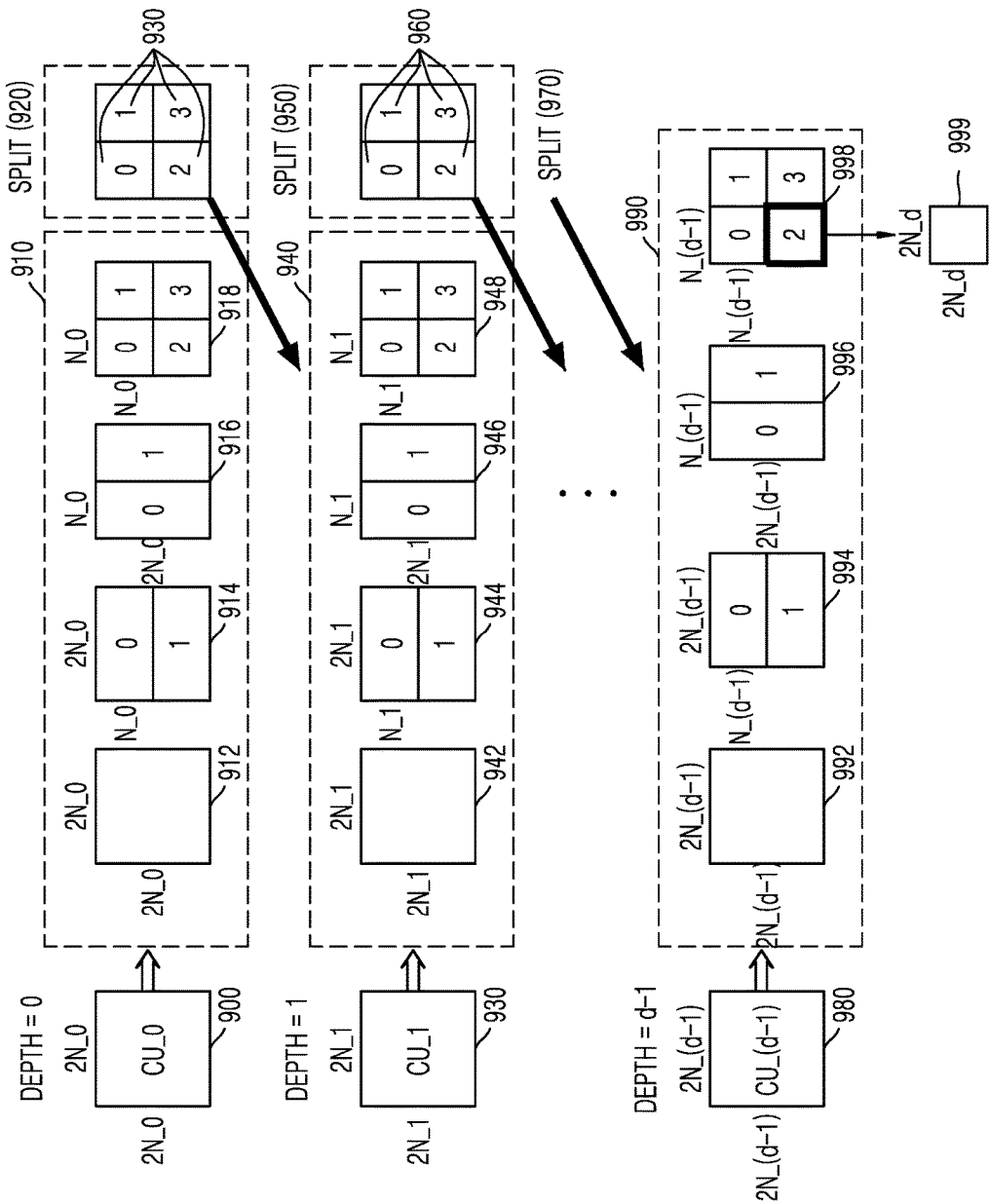
FIG. 14 is a diagram of deeper coding units, according to an embodiment.

FIG. 14 is a diagram of deeper coding units according to depths, according to one or more embodiments.

Splitting information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×

Figure 23:
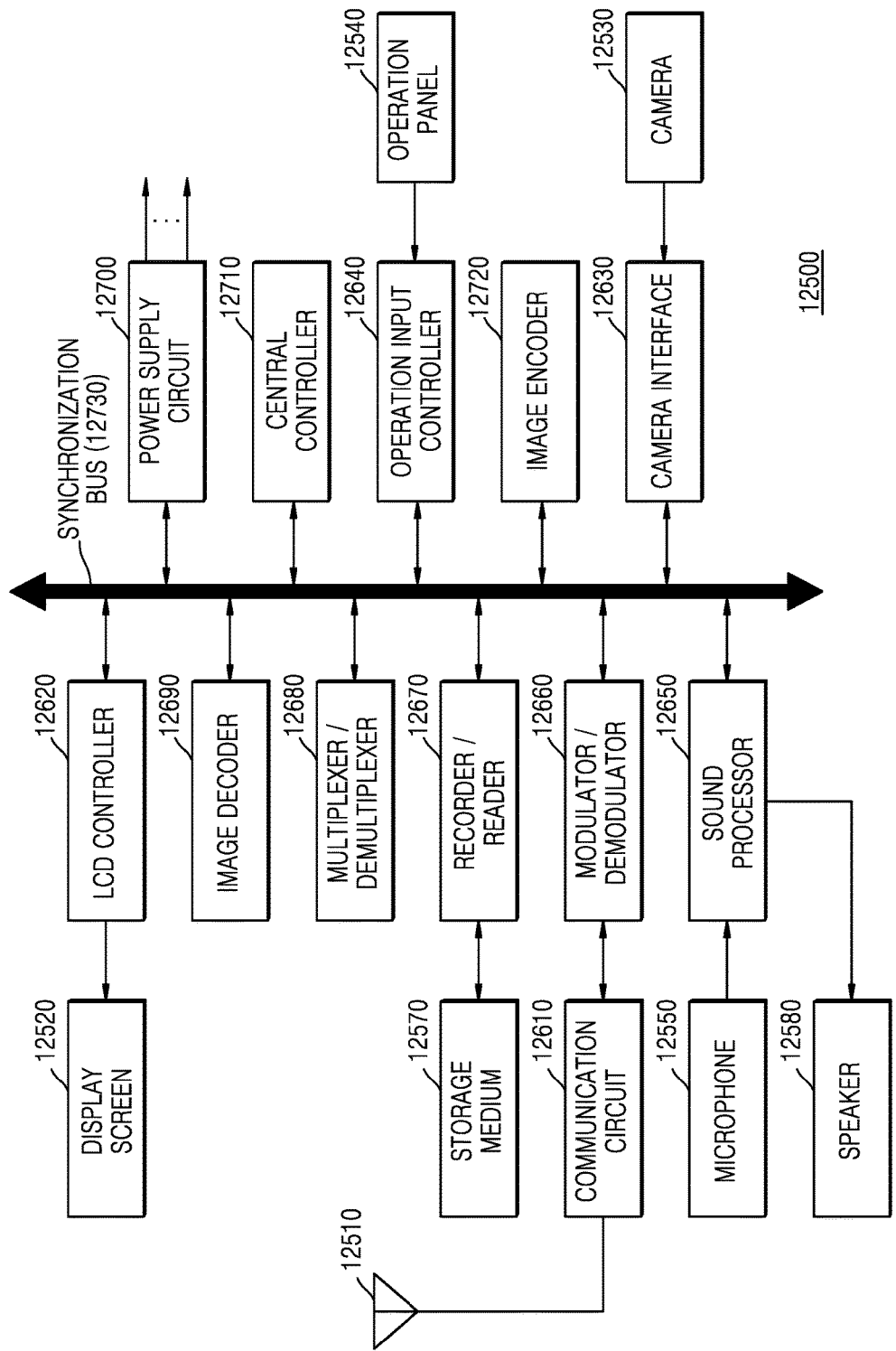

N_0, a partition mode 916 having a size of N_0×2N_0, and a partition mode 918 having a size of N_0×N_0. FIG. 23 only illustrates the partition modes 912 through 918 which are obtained by symmetrically splitting the prediction unit 910, but a partition mode is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912 through 916, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and splitting information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes 992 through 998 to search for a partition mode having a minimum encoding error.

Even when the partition mode 998 has the minimum encoding error, since a maximum depth is d, a coding unit CU_(d−1) having a depth of d−1 is no longer split to a lower depth, and a depth for the coding units constituting a current LCU 900 is determined to be d−1 and a partition mode of the current LCU 900 may be determined to be N_(d−1)×N_(d−1). Also, since the maximum depth is d and an SCU 980 having a lowermost depth of d−1 is no longer split to a lower depth, splitting information for the SCU 980 is not set.

A data unit 999 may be a 'minimum unit' for the current LCU. A minimum unit according to one or more embodiments may be a square data unit obtained by splitting an SCU 980 by 4. By performing the encoding repeatedly, the video encoding apparatus 100 may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a depth. The depth, the partition mode of the prediction unit, and the prediction mode may be encoded and transmitted as information about an encoding mode. Also, since a coding unit is split from a depth of 0 to a depth, only splitting information of the depth is set to 0, and splitting information of depths excluding the depth is set to 1.

The image data and encoding information extractor 220 of the video decoding apparatus 200 may extract and use the information about the depth and the prediction unit of the coding unit 900 to decode the partition 912. The video decoding apparatus 200 may determine a depth, in which splitting information is 0, as a depth by using splitting information according to depths, and use information about an encoding mode of the corresponding depth for decoding.

Figure 15:
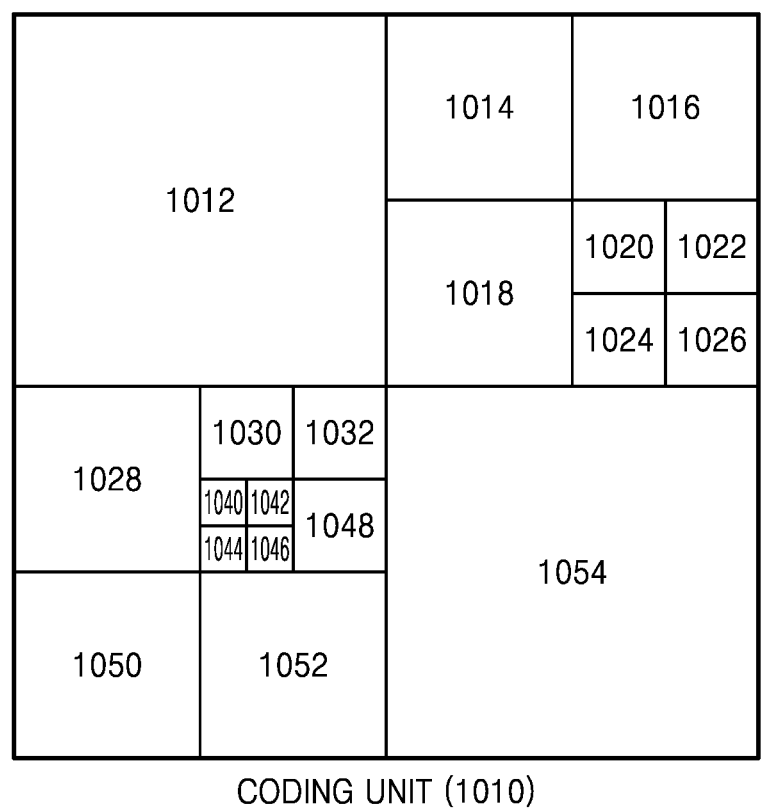
FIGS. 15 through 17 are diagrams for describing a relationship between coding units, prediction units, and transformation units, according to an embodiment.
Figure 16:
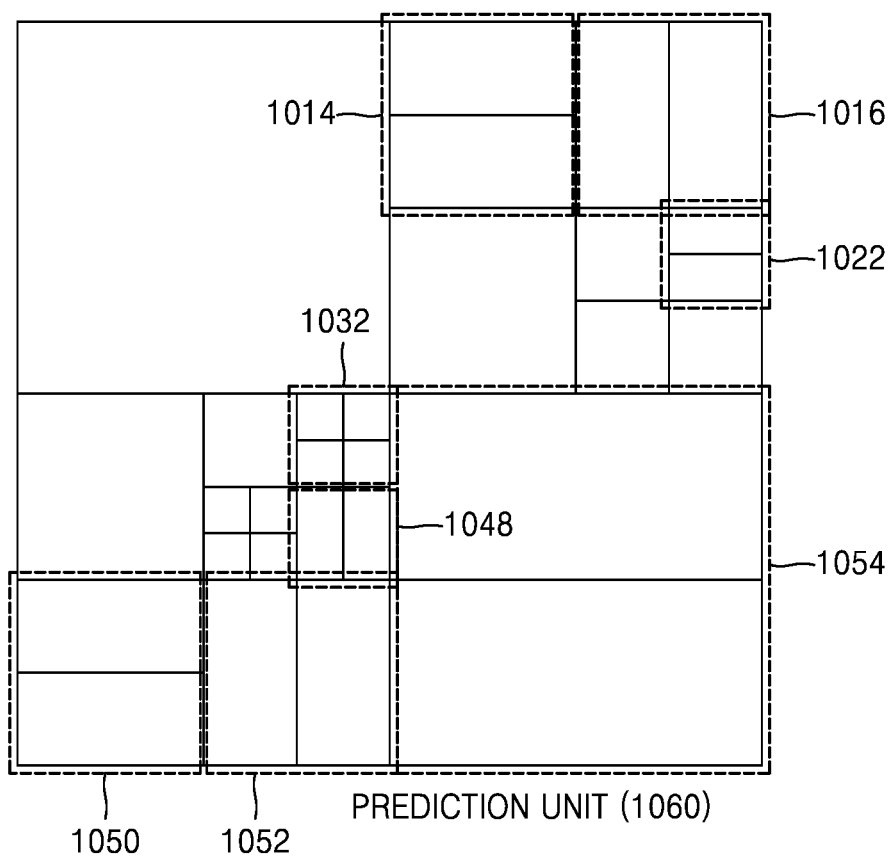
Figure 17:
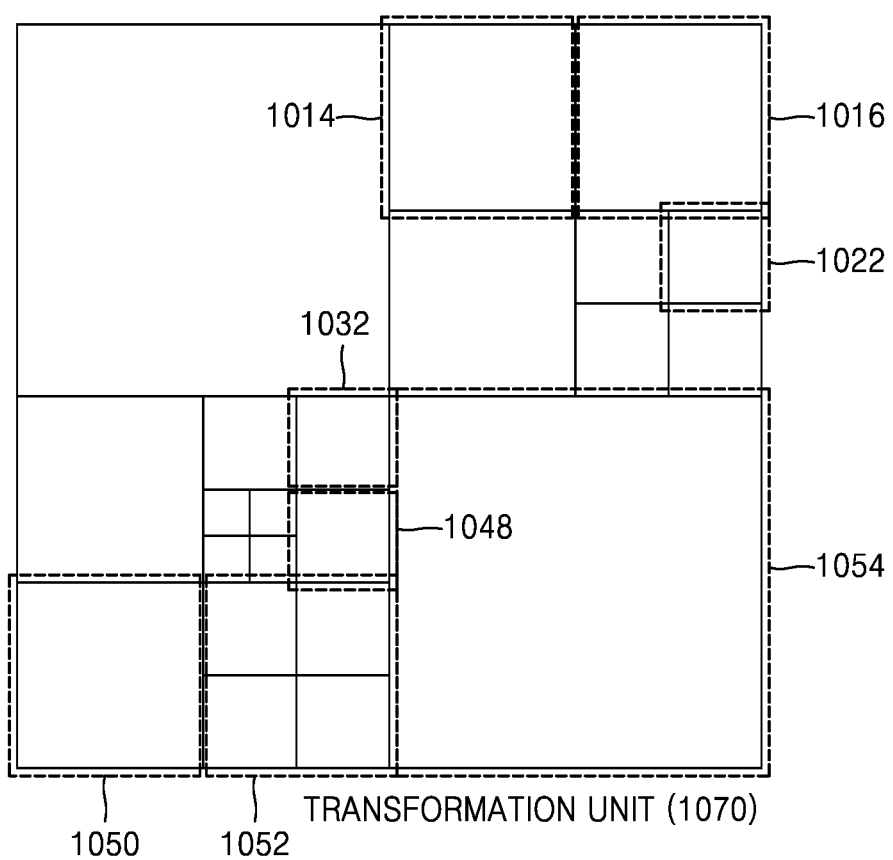

FIGS. 15 through 17 are diagrams for describing a relationship between coding units 1010, prediction units 1060, and transformation units 1070, according to one or more embodiments.

The coding units 1010 are coding units having a tree structure, corresponding to depths determined by the video encoding apparatus 100, in a LCU. The prediction units 1060 are partitions of prediction units of each of the coding units 1010, and the transformation units 1070 are transformation units of each of the coding units 1010.

When a depth of a LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition modes in the coding units 1014, 1022, 1050, and 1054 have a size of 2N×N, partition modes in the coding units 1016, 1048, and 1052 have a size of N×2N, and a partition mode of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a LCU to determine an optimum coding unit, and thus coding units having a recursive tree structure may be obtained. Encoding information may include splitting information about a coding unit, information about a partition mode, information about a prediction mode, and information about a size of a transformation unit. Table 1 shows the encoding information that may be set by the video encoding and decoding apparatuses 100 and 200.

having the size of 2N×2N is a symmetrical partition mode, a size of a transformation unit may be N×N, and if the partition mode of the current coding unit is an asymmetrical partition mode, the size of the transformation unit may be N/2×N/2.

TABLE 1

Splitting information 0
(Encoding on Coding Unit having Size of 2N × 2N and Current Depth of d)

| | Partition mode | | Size of Transformation Unit | | |
|---|---|---|---|---|---|
| Prediction Mode | Symmetrical Partition mode | Asymmetrical Partition mode | Splitting information 0 of Transformation Unit | Splitting information 1 of Transformation Unit | Splitting information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The outputter 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Splitting information indicates whether a current coding unit is split into coding units of a lower depth. If splitting information of a current depth d is 0, a depth, in which a current coding unit is no longer split into a lower depth, is a final depth, and thus information about a partition mode, prediction mode, and a size of a transformation unit may be defined for the final depth. If the current coding unit is further split according to the splitting information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transformation unit may be set to be two types in the intra mode and two types in the inter mode. In other words, if splitting information of the transformation unit is 0, the size of the transformation unit may be 2N×2N, which is the size of the current coding unit. If splitting information of the transformation unit is 1, the transformation units may be obtained by splitting the current coding unit. Also, if a partition mode of the current coding unit The encoding information about coding units having a tree structure may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 18:
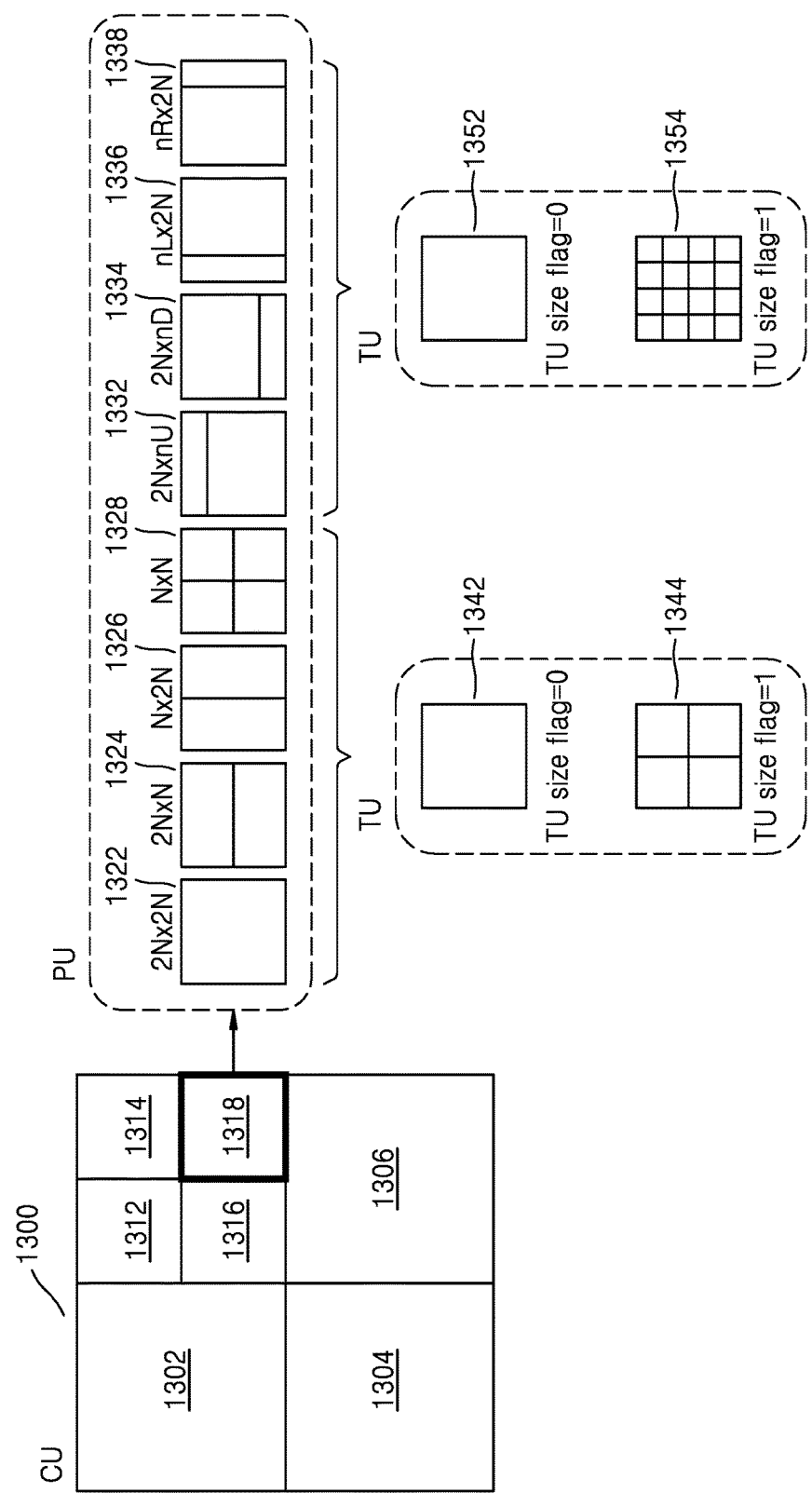
FIG. 18 is a diagram for describing a relationship between a coding unit, a prediction unit, and a transformation unit, according to encoding mode information of Table 1.

FIG. 18 is a diagram for describing a relationship between a coding unit, a prediction unit, and a transformation unit, according to encoding mode information of Table 1.

A LCU 1300 includes coding units 1302, 1304, 1306, 1312, 1314, 1316, and 1318 of depths. Here, since the coding unit 1318 is a coding unit of a depth, splitting information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Splitting information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode is set to be asymmetrical, i.e., the partition mode 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 11, the TU size flag is a flag having a value or 0 or 1, but the TU size flag is not limited to 1 bit, and a transformation unit may be hierarchically split having a tree structure while the TU size flag increases from 0. Splitting information (TU size flag) of a transformation unit may be an example of a transformation index.

In this case, the size of a transformation unit that has been actually used may be expressed by using a TU size flag of a transformation unit, according to one or more embodiments, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a–1) then the size of a transformation unit may be 32×32 when a TU size flag is 0, (a–2) may be 16×16 when the TU size flag is 1, and (a–3) may be 8×8 when the TU size flag is 2.

As another example, (b) if the size of the current coding unit is 32×32 and a minimum transformation unit size is 32×32, (b–1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to one or more embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the embodiments are not limited thereto.

According to the video encoding method based on coding units having a tree structure as described with reference to FIGS. 6 through 18, image data of the space domain is encoded for each coding unit of a tree structure. According to the video decoding method based on coding units having a tree structure, decoding is performed for each LCU to reconstruct image data of the space domain. Thus, a picture and a video that is a picture sequence may be reconstructed. The reconstructed video may be reproduced by a reproducing apparatus, stored in a storage medium, or transmitted through a network.

Also, an offset parameter may be signaled according to pictures, slices, or LCUs, or according to coding units having a tree structure, according to prediction units of a coding unit, or according to transformation units of a coding unit. For example, an LCU having a minimum error from an original block may be reconstructed by adjusting reconstruction pixel values of an LCU by using offset values reconstructed based on offset parameters received according to LCUs.

For convenience of description, the video encoding method described above with reference to FIGS. 1 through 18, will be referred to as an 'video encoding method according to the various embodiments'. In addition, the video decoding method described above with reference to FIGS. 1 through 18, will be referred to as an 'video decoding method according to the various embodiments'.

Also, a video encoding apparatus including the video encoding apparatus 30 or 40, the video encoding apparatus 100, or the image encoder 400, which is described above with reference to FIGS. 1 through 18, will be referred to as an 'video encoding apparatus according to the various embodiments'. In addition, a video decoding apparatus including the video decoding apparatus 200 or the image decoder 500, which is described above with reference to FIGS. 1 through 18, will be referred to as an 'video decoding apparatus according to the various embodiments'.

A computer-readable recording medium storing a program, e.g., a disc 26000, according to various embodiments will now be described in detail.

Figure 19:
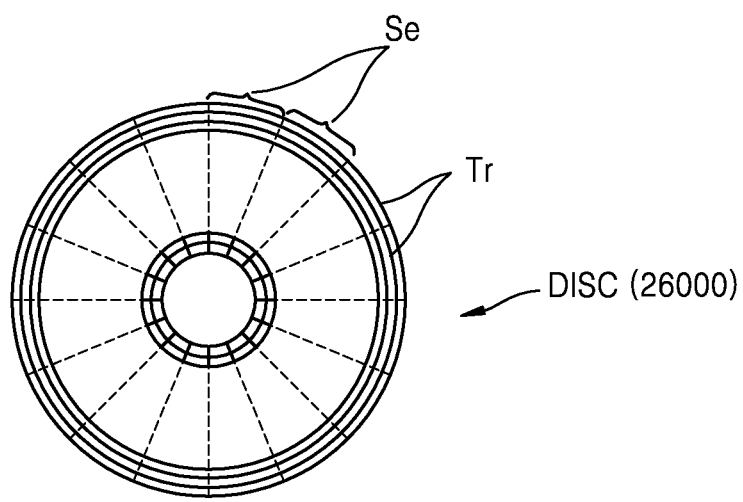
FIG. 19 is a diagram of a physical structure of a disc in which a program is stored, according to an embodiment.

FIG. 19 is a diagram of a physical structure of the disc 26000 in which a program is stored, according to one or more embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the image encoding method, and the video decoding method described above may be assigned and stored.

A computer system embodied using a storage medium that stores a program for executing the image encoding method and the video decoding method as described above will now be described with reference to FIG. 20.

Figure 20:
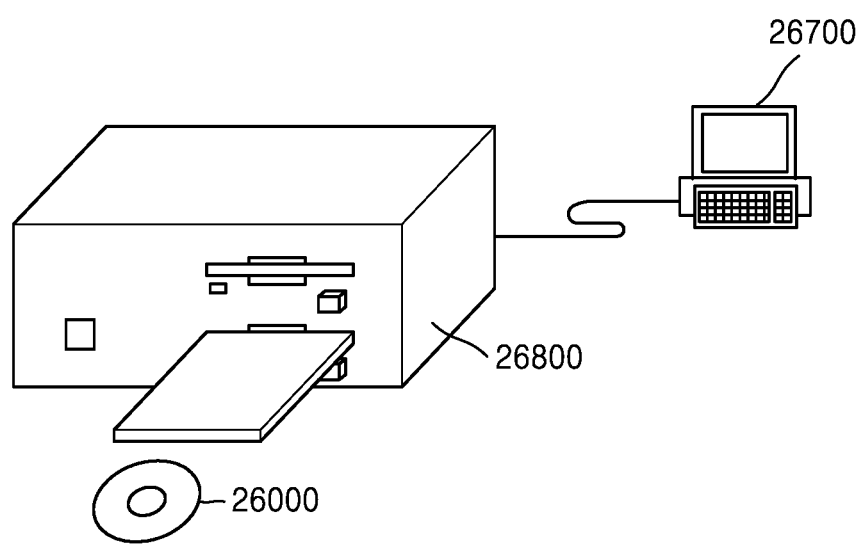
FIG. 20 is a diagram of a disc drive for recording and reading a program by using a disc.

FIG. 20 is a diagram of a disc drive 26800 for recording and reading a program by using the disc 26000. A computer system 26700 may store a program that executes at least one of a image encoding method and a video decoding method according to one or more embodiments, in the disc 26000 via the disc drive 26800. To run the program stored in the disc 26000 in the computer system 26700, the program may be read from the disc 26000 and be transmitted to the computer system 26700 by using the disc drive 26700.

Figure 21:
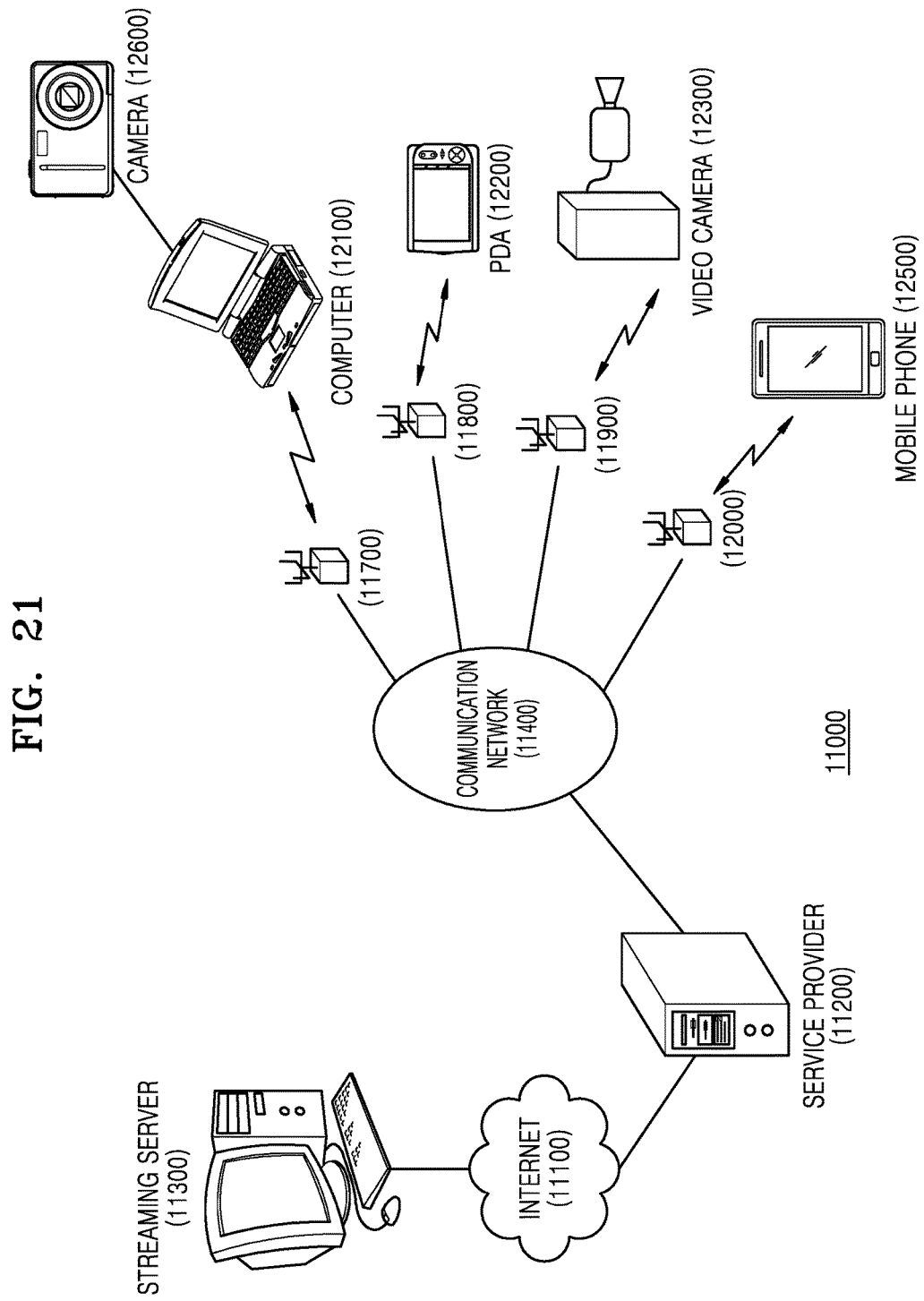
FIG. 21 is a diagram of an overall structure of a content supply system for providing a content distribution service.
Figure 22:
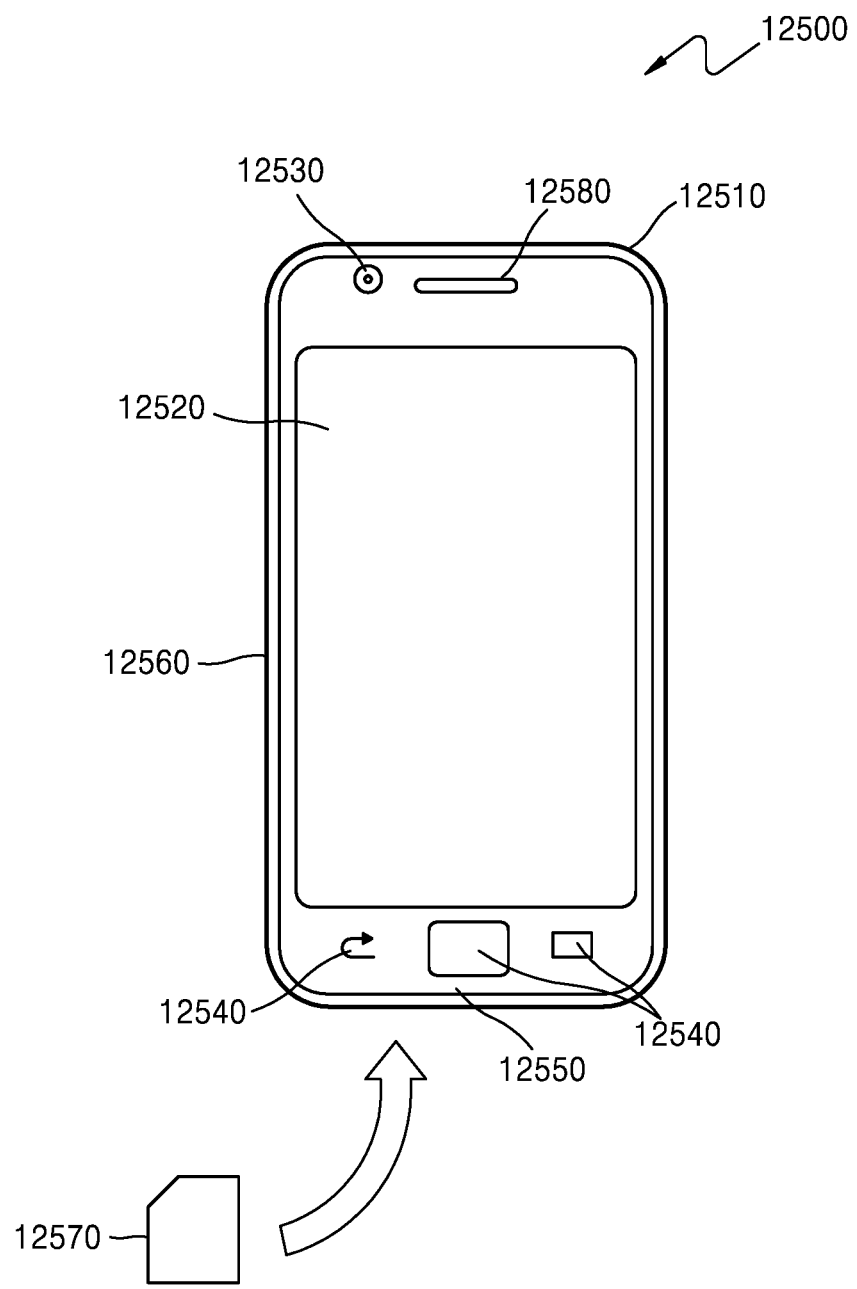
FIGS. 22 and 23 are diagrams respectively of an external structure and an internal structure of a mobile phone to which a video encoding method and a video decoding method are applied, according to an embodiment.

The program that executes at least one of a image encoding method and a video decoding method according to one or more embodiments may be stored not only in the disc 26000 illustrated in FIG. 21 or 22 but also in a memory card, a ROM cassette, or a solid state drive (SSD).

A system to which the image encoding method and a video decoding method described above are applied will be described below.

FIG. 21 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a image encoding apparatus and a video decoding apparatus according to one or more embodiments.

The mobile phone 12500 included in the content supply system 11000 according to one or more embodiments will now be described in greater detail with referring to FIGS. 22 and 23.

FIG. 22 illustrates an external structure of the mobile phone 12500 to which a image encoding method and a video decoding method are applied, according to one or more embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound outputter, and a microphone 12550 for inputting voice and sound or another type sound inputter. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 23 illustrates an internal structure of the mobile phone 12500, according to one or more embodiments. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described image encoding method according to the one or more embodiments. The image encoder 12720 may transform the image data received from the camera 12530 into compressed and encoded image data based on the above-described image encoding method according to the one or more embodiments, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoder 12690 may correspond to that of the above-described video decoding method according to the one or more embodiments. The image decoder 12690 may decode the encoded video data to obtain reconstructed video data and provide the reconstructed video data to the display screen 12520 via the LCD controller 12620, by using the above-described video decoding method according to the one or more embodiments.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a image encoding apparatus and a video decoding apparatus according to one or more embodiments, may be a transceiving terminal including only the image encoding apparatus, or may be a transceiving terminal including only the video decoding apparatus.

Figure 24:
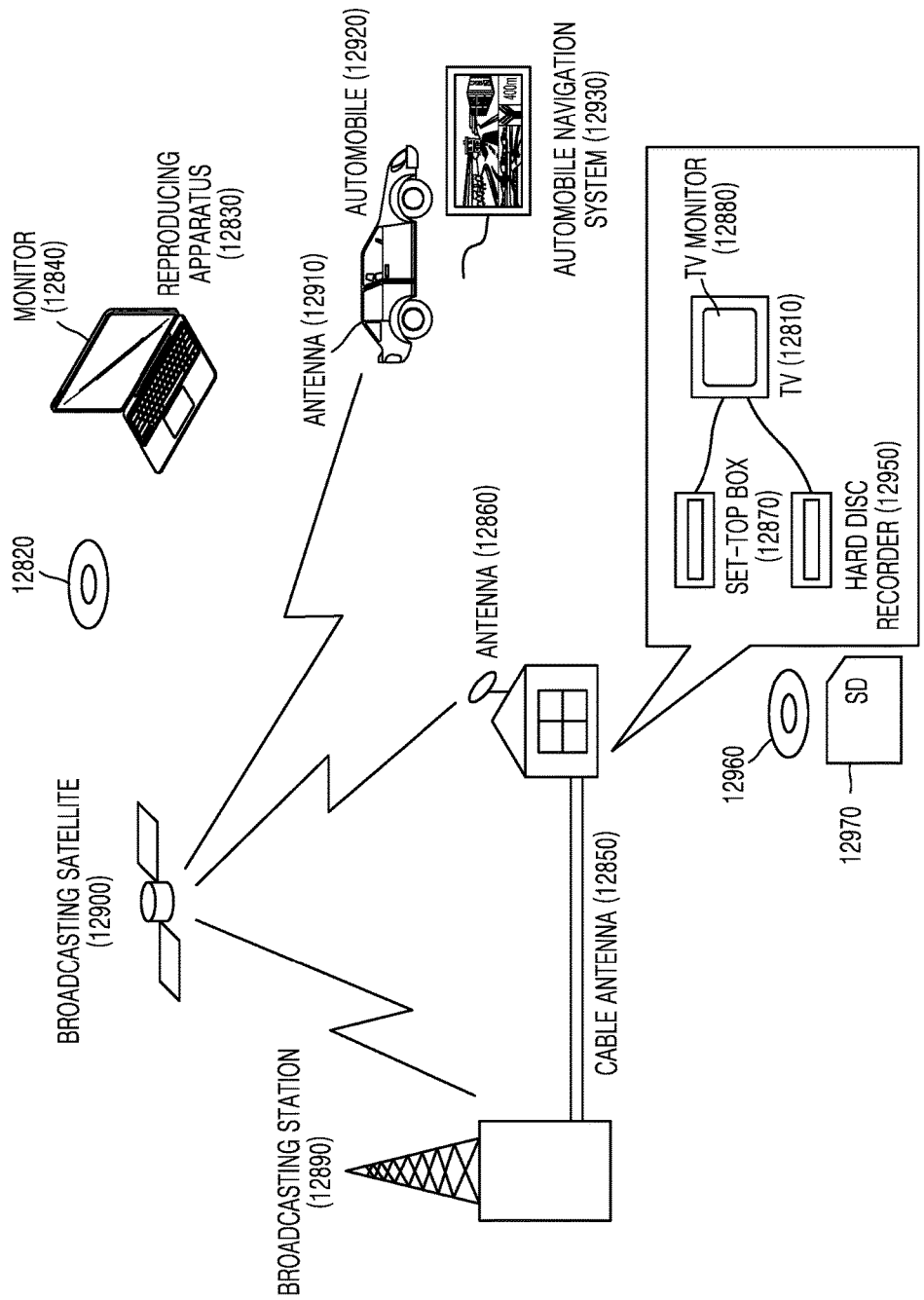
FIG. 24 is a diagram of a digital broadcast system to which a communication system is applied, according to an embodiment.

A communication system according to the one or more embodiments is not limited to the communication system described above with reference to FIG. 22. For example, FIG. 24 illustrates a digital broadcasting system employing a communication system, according to one or more embodiments. The digital broadcasting system of FIG. 24 may receive a digital broadcast transmitted via a satellite or a terrestrial network by using a image encoding apparatus and a video decoding apparatus according to one or more embodiments.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to one or more embodiments is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to one or more embodiments may be installed. Data output from the set-top box 12870 may also be reproduced on a TV monitor 12880.

As another example, a video decoding apparatus according to one or more embodiments may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a image encoding apparatus according to one or more embodiments and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to one or more embodiments, a video signal recorded on the DVD disc 12960, the SD card 12970, or another storage medium may be reproduced on the TV monitor 12880.

The automobile navigation system 12930 may not include the camera 12530 of FIG. 24, and the camera interface 12630 and the image encoder 12720 of FIG. 24. For example, the computer 12100 and the TV receiver 12810 may not include the camera 12530, the camera interface 12630, and the image encoder 12720.

Figure 25:
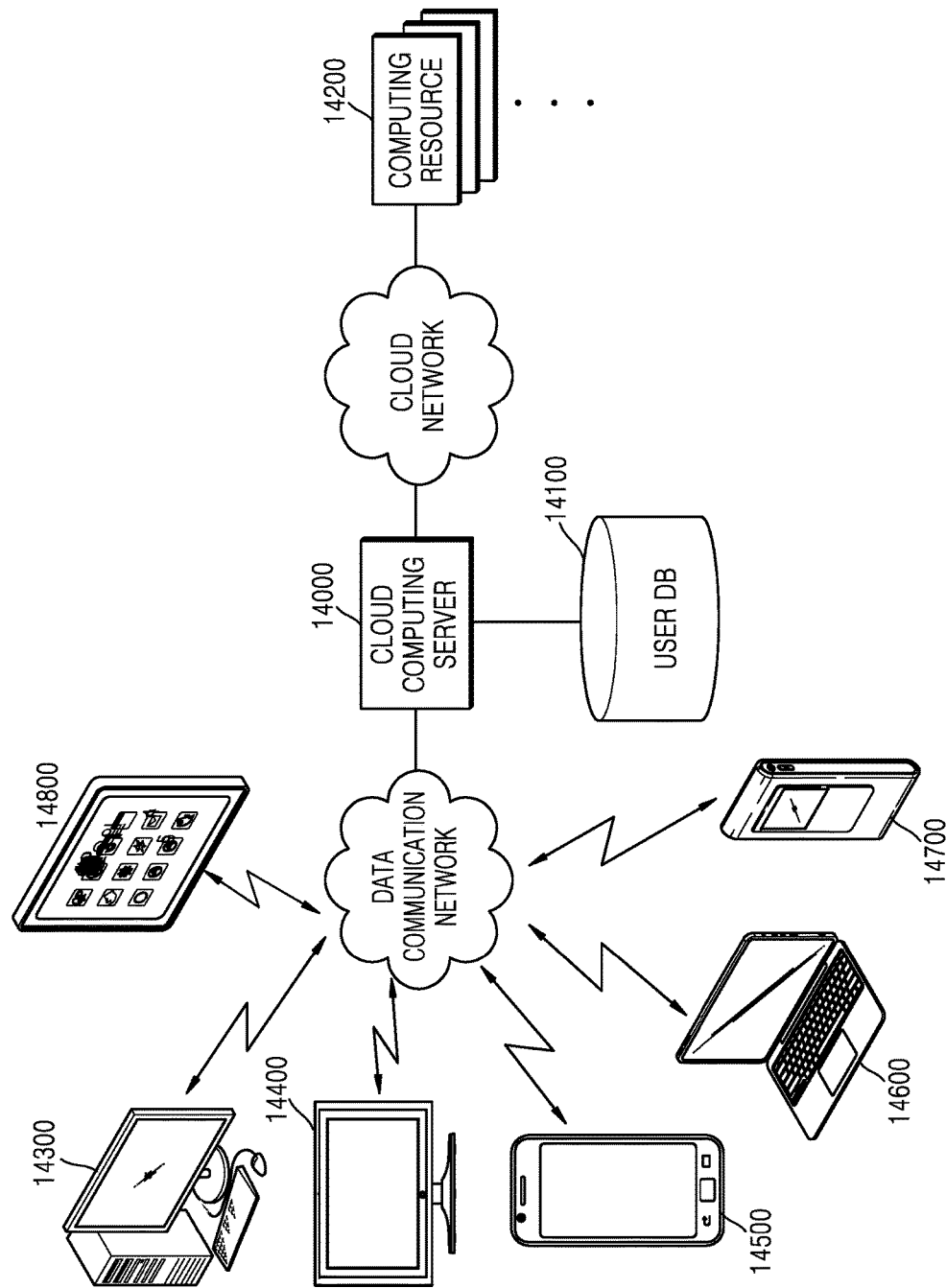
FIG. 25 is a diagram illustrating a network structure of a cloud computing system using a video encoding apparatus and a video decoding apparatus, according to an embodiment.

FIG. 25 is a diagram illustrating a network structure of a cloud computing system using a image encoding apparatus and a video decoding apparatus, according to one or more embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 22.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1 through 18. As another example, the user terminal may include a image encoding apparatus as described above with reference to FIGS. 1 through 18. Alternatively, the user terminal may include both the video decoding apparatus and the image encoding apparatus as described above with reference to FIGS. 1 through 18.

Various applications of a image encoding method, a video decoding method, a image encoding apparatus, and a video decoding apparatus according to the one or more embodiments described above with reference to FIGS. 1 through 18 have been described above with reference to FIGS. 19 to 25. However, methods of storing the image encoding method and the video decoding method in a storage medium or methods of implementing the image encoding apparatus and the video decoding apparatus in a device, according to various embodiments, described above with reference to FIGS. 1 through 18 are not limited to the embodiments described above with reference to FIGS. 19 to 25.

The embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An image codec method comprising:
   processing, by at least one hardware processor included in an image codec apparatus, information stored in at least one memory included in the image codec apparatus, to thereby cause the image codec apparatus to perform:
   calculating a difference value between a rate-distortion (R-D) cost of a first coefficient level from among coefficient levels of a sub-block unit of an image and an R-D cost of a second coefficient level adjacent to the first coefficient level by using a distortion difference calculated by using an integer of the first coefficient level and an integer of the second coefficient level and a rate variation between the first coefficient level and the second coefficient level,
   selecting one of values of the integer of the first coefficient level and the integer of the second coefficient level as a modified value of the first coefficient level based on the difference value, the modified value of the first coefficient level to be output for encoding or decoding of the image,
   calculating a difference value of an R-D cost when a value of a coefficient level corresponding to a first sample position that is a position of a nonzero coefficient level generated last according to a forward scan order from among sample positions of the sub-block unit is modified to 0,
   sequentially calculating difference values of R-D costs in a reverse scan order when values of coefficient levels corresponding to positions of nonzero coefficient levels existing after the first sample position are modified to 0 in the reverse scan order,
   searching for a second sample position in which a value obtained by sequentially adding difference values of R-D costs of the sample positions according to the reverse scan order is lowest, and
   modifying to 0 values of coefficient levels corresponding to sample positions before the second sample position according to the reverse scan order,
   wherein the searching for the second sample position comprises stopping searching for the second sample position when a sample position in which a value of a coefficient level is equal to or higher than 2 is found.

2. The image codec method of claim 1, further comprising:
   determining a coefficient level corresponding to the second sample position from among the coefficient levels as a last significant coefficient (LSC); and
   encoding or decoding information indicating a position of the LSC.

3. The image codec method of claim 1, wherein the searching for the second sample position comprises calculating a lowest value of a prefix sum in a structure of a prefix tree,
   wherein the structure of the prefix tree is a structure in which two sample positions adjacent in the reverse scan order are assigned as a pair and difference values of R-D costs corresponding to the two sample positions in the pair are sequentially added.

4. The image codec method of claim 1, wherein, when a value of the first coefficient level is 0, the modified value of the first coefficient level is 0, and when the value of the first coefficient level is 2, the modified value of the first coefficient level is one of 0, 1, and 2.

5. The image codec method of claim 1, the modified value of the first coefficient level is to be output in sub-block units of the image.

6. The image codec method of claim 1, wherein the calculating of the difference value comprises calculating the difference value by using a normalized R-D cost function.

7. An image codec apparatus comprising:
at least one hardware processor that processes information stored in at least one memory to implement:
a rate-distortion (R-D) cost calculator to calculate a difference value between a rate-distortion (R-D) cost of a first coefficient level from among coefficient levels of a sub-block unit of the image and an R-D cost of a second coefficient level adjacent to the first coefficient level by using a distortion difference calculated by using an integer of the first coefficient level and an integer of the second coefficient level and a rate variation between the first coefficient level and the second coefficient level,
a coefficient level modifier to select one of values of the integer of the first coefficient level and the integer of the second coefficient level as a modified value of the first coefficient level based on the difference value,
a coefficient level outputter to output the modified value of the first coefficient level for encoding or decoding of the image,
wherein the R-D cost calculator calculates a difference value of an R-D cost when a value of a coefficient level corresponding to a first sample position that is a position of a nonzero coefficient level generated last according to a forward scan order from among sample positions of the sub-block is modified to 0, and sequentially calculates difference values of R-D costs in a reverse scan order when values of coefficient levels corresponding to positions of nonzero coefficient levels existing after the first sample position are modified to 0 in the reverse scan order, and
the at least one hardware processor further implements a last significant coefficient (LSC) determiner to search for a second sample position in which a value obtained by sequentially adding difference values of R-D costs of the sample positions according to the reverse scan order is lowest, and modify to 0 values of coefficient levels corresponding to sample positions before the second sample position according to the reverse scan order,
wherein the LSC determiner stops searching for the second sample position when a sample position in which a value of a coefficient level is equal to or higher than 2 is found.

8. The image codec apparatus of claim 7, wherein the LSC determiner determines a coefficient level corresponding to the second sample position from among the coefficient levels as a last significant coefficient (LSC), and
the at least one hardware processor further implements an LSC information encoder or decoder to encode or decode, respectively, information indicating a position of the LSC.

9. The image codec apparatus of claim 7, wherein the LCS determiner calculates a lowest value of a prefix sum in a structure of a prefix tree,
wherein the structure of the prefix tree is a structure in which two sample positions adjacent in the reverse scan order are assigned as a pair and difference values of R-D costs corresponding to the two sample positions in the pair are sequentially added.

10. The image codec apparatus of claim 7, wherein, when a value of the first coefficient level is 0, the modified value of the first coefficient level is 0, and when the value of the first coefficient level is 2, the modified value of the first coefficient level is one of 0, 1, and 2.

11. The image codec apparatus of claim 7, wherein the modified value of the first coefficient level is output in sub-block units of the image.

12. The image codec apparatus of claim 7, wherein the R-D cost calculator calculates the difference value by using a normalized R-D cost function.

13. A non-transitory computer-readable recording medium having recorded thereon a program, which when executed by a computer, performs the image codec method of claim 1.

* * * * *